(12) United States Patent
Tutuk et al.

(10) Patent No.: US 10,324,917 B2
(45) Date of Patent: Jun. 18, 2019

(54) METHODS AND SYSTEMS FOR DATA MANAGEMENT

(71) Applicant: QlikTech International AB, Lund (SE)

(72) Inventors: Elif Tutuk, Madison, WI (US); Håkan Wolgé, Malmö (SE); Alistair Eaves, London (GB)

(73) Assignee: QLIKTECH INTERNATIONAL AB, Lund (SE)

( * ) Notice: Subject to any disclaimer, the term of this patent is extended or adjusted under 35 U.S.C. 154(b) by 293 days.

(21) Appl. No.: 14/054,321

(22) Filed: Oct. 15, 2013

(65) Prior Publication Data

US 2014/0108467 A1 Apr. 17, 2014

Related U.S. Application Data

(60) Provisional application No. 61/722,741, filed on Nov. 5, 2012, provisional application No. 61/714,085, filed on Oct. 15, 2012.

(51) Int. Cl.
*G06F 16/00* (2019.01)
*G06F 16/22* (2019.01)

(52) U.S. Cl.
CPC .................. *G06F 16/2282* (2019.01)

(58) Field of Classification Search
None
See application file for complete search history.

(56) References Cited

U.S. PATENT DOCUMENTS

| | | | | |
|---|---|---|---|---|
| 7,058,621 | B1* | 6/2006 | Wolge | G06F 17/30595 |
| 7,130,812 | B1* | 10/2006 | Iyer | G06F 17/3051 |
| | | | | 705/28 |
| 7,158,994 | B1* | 1/2007 | Smith | G06F 17/30418 |
| | | | | 707/717 |
| 8,745,099 | B2* | 6/2014 | Wolge | G06F 17/30572 |
| | | | | 707/609 |
| 2002/0147777 | A1* | 10/2002 | Hackbarth | G06Q 10/107 |
| | | | | 709/205 |
| 2002/0161748 | A1* | 10/2002 | Hamel | G06F 17/30563 |
| 2002/0184239 | A1* | 12/2002 | Mosher, Jr. | G06F 11/1471 |
| 2009/0024571 | A1* | 1/2009 | Thiyagarajan | G06F 17/30457 |
| 2013/0159307 | A1* | 6/2013 | Wolge | G06F 17/30572 |
| | | | | 707/737 |
| 2013/0159882 | A1* | 6/2013 | Wolge | G06F 17/30572 |
| | | | | 715/753 |
| 2013/0159901 | A1* | 6/2013 | Wolge | G06F 17/30572 |
| | | | | 715/765 |

\* cited by examiner

*Primary Examiner* — Bai D Vu
(74) *Attorney, Agent, or Firm* — Ballard Spahr LLP

(57) ABSTRACT

Systems and methods for data management are disclosed. One method can comprise defining a plurality of data tables, wherein one or more of the data tables comprises a data field, loading a first data table of the plurality of data tables in a first memory, wherein one or more data fields of the first data table is associated with a second data table of the plurality of data tables, and wherein the second data table is resident in a second memory, and presenting a visualization of the first data table and the second data table.

19 Claims, 35 Drawing Sheets

```
OrderFactTable;
    LOAD    CarrierTrackingNumber
            ,ProductID
            ,OrderQty
            ,Price
    SQL SELECT
            CarrierTrackingNumber
            ,ProductID
            ,OrderQty
            ,Price
    FROM AdventureWorks.Sales.SalesOrderDetail;
```

```
OrderFactTable;
LOAD    CarrierTrackingNumber
        ,ProductID
        ,OrderQty
        ,Price
SQL SELECT
        CarrierTrackingNumber
        ,ProductID
        ,OrderQty
        ,Price
FROM AdventureWorks.Sales.SalesOrderDetail;
```

FIG. 2

```
OrderFactTable;
DIRECT SELECT
        CarrierTrackingNumber
        ,ProductID
FROM AdventureWorks.Sales.SalesOrderDetail;
```

| General | Folders | Documents | Performance | Logging | Security | Alerts | Login |

CPU
CPU Affinity: ☑ ☑ ☑ ☑
CPU Throttle: [ 0 ]% (0 means no throttling)

Reload Limits
Max Concurrent Reloads: [ 2 ]

Sessions
Maximum Number of Concurrent Sessions: [ 5000 ]
Maximum Inactive Session Time: [ 1800 ] seconds
Possible Session Timeout: [ 1800 ] seconds
Maximum Total Session Time: [     ] seconds

Working Set
Low: [ 70 ]%
High: [ 90 ]%

Document
Object Calculation Time Limit: [ 60 ] seconds
Max Symbols in Charts: [ 500 ]
☑ Allow Document Auto Load

[ Apply ]  [ Cancel ]

FIG. 21

```
OrderFactTable;
DIRECT  (Stable after 5 senconds)    SELECT
         CarrierTrackingNumber
         ,ProductID
FROM AdventureWorks.Sales.SalesOrderDetail;
```

```
DIRECT SELECT
    "EXTRACT(YEAR FROM SHIPDATE)" as Year,
    "EXTRACT(MONTH FROM SHIPDATE)" as Month,
    SHIPMODE,
    NATIONNAME
FROM tpcd1TB.CustLineItemOrder_view ;
```

Two new data fields are created by using the direct discovery source field to be used on the QlikView user interface

FIG. 31

METHODS AND SYSTEMS FOR DATA MANAGEMENT

CROSS REFERENCE TO RELATED PATENT APPLICATION

This application claims priority to U.S. Patent Application No. 61/714,085 filed Oct. 15, 2012, and U.S. Patent Application No. 61/722,741 filed Nov. 5, 2012, each of which is herein incorporated by reference in its entirety.

BACKGROUND

The ability to analyze large data sets is a critical element in any business analytics solution. Such analysis allows business professionals to study incredible volumes of disparate data. Analyzing large data sets can be computationally and time intensive. Another challenge with analysis of large data sets is locating relevant data in one or more voluminous databases. The present disclosure addresses these and other shortcomings in data management and analysis.

SUMMARY

It is to be understood that both the following general description and the following detailed description are exemplary and explanatory only and are not restrictive, as claimed. Provided are methods and systems for data management and analysis. The methods and systems described herein, in one aspect, can facilitate the analysis of information to provide transparent and usable output for various users.

In an aspect, a method for data management can comprise defining a plurality of data tables, wherein one or more of the data tables can comprise a data field. A first data table of the plurality of data tables can be loaded in a first memory, wherein one or more data fields of the first data table is associated with a second data table of the plurality of data tables, and wherein the second data table resident in a second memory. Visualization of the first data table and the second data table can be presented.

In another aspect, a method for data management can comprise loading a first portion of stored data in a first memory, wherein a second portion of the stored data is resident in a second memory. A visualization of the first data and the second data can be presented. One or more of the first data and the second data can be analyzed, wherein analysis of the first data is implemented locally to the first memory and analysis of the second data is implemented locally to the second memory.

In another aspect, a method for data management can comprise defining a plurality of data tables, wherein one or more of the data tables can comprise a data field. A first data table of the plurality of data tables can be loaded in a first memory, wherein one or more data fields of the first data table is associated with a second data table of the plurality of data tables, and wherein one or more data fields of the second data table is resident in a second memory. A visualization of the first data table can be presented. A symbol table representing the second data table can be presented.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 2 is exemplary load script syntax;
FIG. 3 is exemplary load script syntax;
FIG. 4B is an enlargement of a portion of the data model interface of FIG. 4A;
FIG. 21 is an exemplary data model interface;
FIG. 31 is exemplary script syntax.

DETAILED DESCRIPTION

Figure 1:
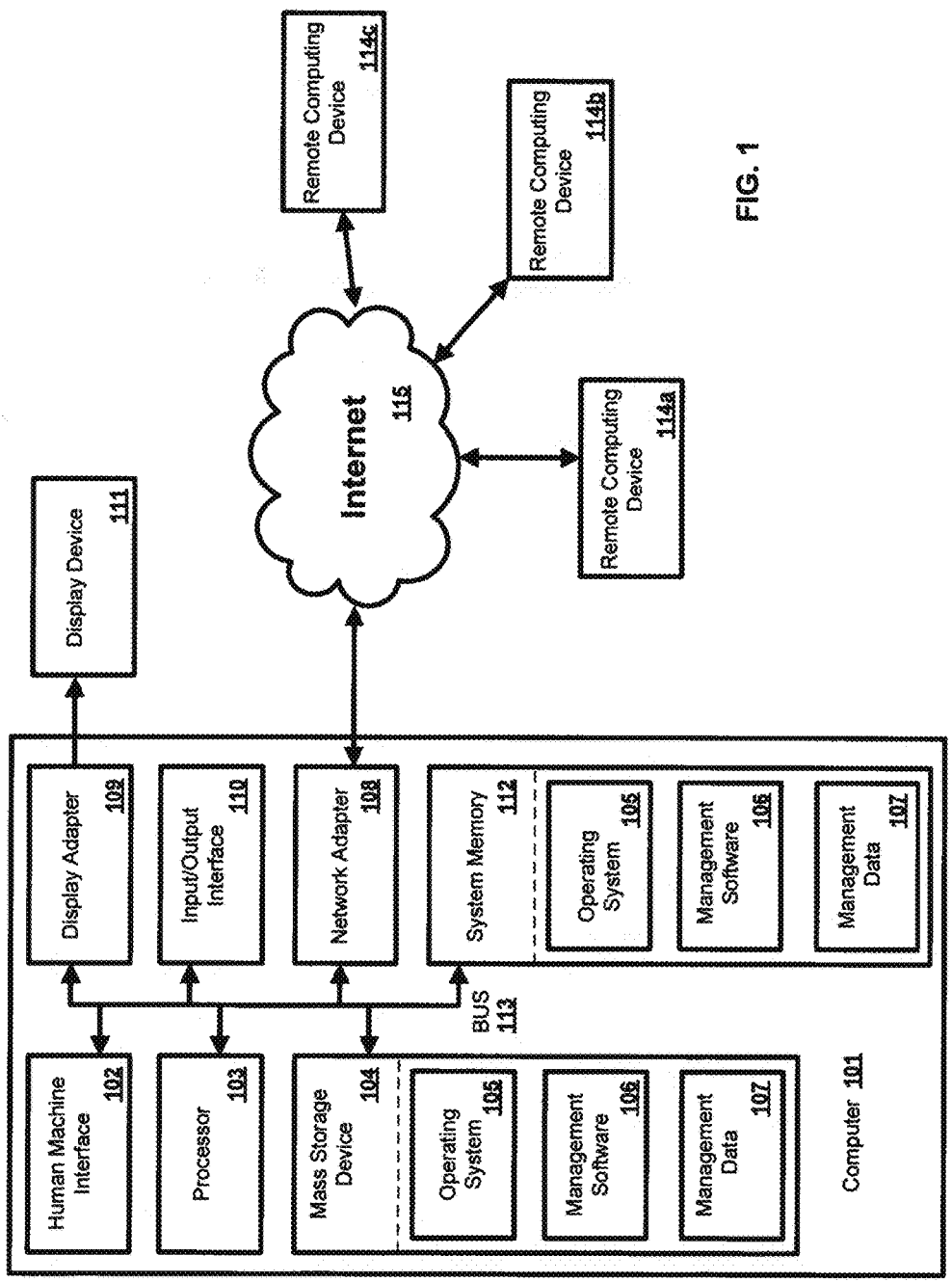
FIG. 1 is an exemplary computing system.

Before the present methods and systems are disclosed and described, it is to be understood that the methods and systems are not limited to specific synthetic methods, specific components, or to particular compositions. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the Examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Provided are methods and systems for data management and analysis. The methods and systems described herein, in one aspect, can facilitate the analysis of information to provide transparent and usable output for various users.

In an aspect, one method for data management can comprise defining a plurality of data tables, wherein one or more of the data tables can comprise a data field. A first data table of the plurality of data tables can be loaded in a first memory, wherein one or more data fields of the first data table is associated (e.g., linked) with a second data table of the plurality of data tables. The second data table can be resident in a second memory. Visualization of the first data table and the second data table can be presented.

FIG. 1 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 101. The components of the computer 101 can comprise, but are not limited to, one or more processors or processing units 103, a system memory 112, and a system bus 113 that couples various system components including the processor 103 to the system memory 112. In the case of multiple processing units 103, the system can utilize parallel computing.

The system bus 113 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 113, and all buses specified in this description can also be implemented over a wired or wireless network connection and each of the subsystems, including the processor 103, a mass storage device 104, an operating system 105, management software 106, management data 107, a network adapter 108, system memory 112, an Input/Output Interface 110, a display adapter 109, a display device 111, and a human machine interface 102, can be contained within one or more remote computing devices 114a,b,c at physically separate locations, connected through buses of this form, in effect implementing a fully distributed system.

The computer 101 typically comprises a variety of computer readable media. Exemplary readable media can be any available media that is accessible by the computer 101 and comprises, for example and not meant to be limiting, both volatile and non-volatile media, removable and non-removable media. The system memory 112 comprises computer readable media in the form of volatile memory, such as random access memory (RAM), and/or non-volatile memory, such as read only memory (ROM). The system memory 112 typically contains data such as management data 107 and/or program modules such as operating system 105 and management software 106 that are immediately accessible to and/or are presently operated on by the processing unit 103.

In another aspect, the computer 101 can also comprise other removable/non-removable, volatile/non-volatile computer storage media. By way of example, FIG. 1 illustrates a mass storage device 104 which can provide non-volatile storage of computer code, computer readable instructions, data structures, program modules, and other data for the computer 101. For example and not meant to be limiting, a mass storage device 104 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 104, including by way of example, an operating system 105 and management software 106. Each of the operating system 105 and management software 106 (or some combination thereof) can comprise elements of the programming and the management software 106. Management data 107 can also be stored on the mass storage device 104. Management data 107 can be stored in any of one or more databases known in the art. Examples of such databases comprise, DB2®. Microsoft® Access, Microsoft® SQL Server, Oracle®, mySQL, PostgreSQL, and the like. The databases can be centralized or distributed across multiple systems.

In another aspect, the user can enter commands and information into the computer 101 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processing unit 103 via a human machine interface 102 that is coupled to the system bus 113, but can be connected by other interface and bus structures, such as a parallel port, game port, an IEEE 1394 Port (also known as a Firewire port), a serial port, or a universal serial bus (USB).

In yet another aspect, a display device 111 can also be connected to the system bus 113 via an interface, such as a display adapter 109. It is contemplated that the computer 101 can have more than one display adapter 109 and the computer 101 can have more than one display device 111. For example, a display device can be a monitor, an LCD (Liquid Crystal Display), or a projector. In addition to the display device 111, other output peripheral devices can comprise components such as speakers (not shown) and a printer (not shown) which can be connected to the computer 101 via Input/Output Interface 110. Any step and/or result of the methods can be output in any form to an output device. Such output can be any form of visual representation, including, but not limited to, textual, graphical, animation, audio, tactile, and the like.

The computer 101 can operate in a networked environment using logical connections to one or more remote computing devices 114a,b,c. By way of example, a remote computing device can be a personal computer, portable computer, a server, a router, a network computer, a peer device or other common network node, and so on. Logical connections between the computer 101 and a remote computing device 114a,b,c can be made via a local area network (LAN) and a general wide area network (WAN). Such network connections can be through a network adapter 108. A network adapter 108 can be implemented in both wired and wireless environments. Such networking environments are conventional and commonplace in offices, enterprise-wide computer networks, intranets, and the Internet 115.

For purposes of illustration, application programs and other executable program components such as the operating system 105 are illustrated herein as discrete blocks, although it is recognized that such programs and components reside at various times in different storage components of the computing device 101, and are executed by the data processor(s) of the computer. An implementation of management software 106 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ artificial intelligence (AI) techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems Expert inference rules generated through a neural network or production rules from statistical learning).

The present method and system allows the seamless blending of data between data stored-in memory and data retrieved on the fly from an external system. This allows for a consistent user experience for the application developer and the end-user. To the user, the data can appear homogeneous even though the data may originate and be composed of in-memory data, data from an external system, or a combination thereof.

The present method and system can achieve a homogenous appearance (visualization) to the user by defining common linking fields between the in-memory dataset and the external dataset(s). By defining the data model in this way the application developers and users can access data in a uniform way without requiring knowledge of the underlying source of the data.

The present method and system can allow for data to be aggregated and filtered across the homogeneous data-model by automatically determining if the data is in-memory, in the external system or a combination thereof. Data can be filtered or selected in any in-memory field including the unique values of linking fields loaded into memory. Data selected in this way is automatically propagated through the data model to show associations in the data. The calculations or queries required to return the associative representation occur both in-memory and in the external dataset depending on the data-model and the linking fields.

In an aspect, the present methods and systems combines the associative capabilities of an in-memory dataset with a query model (e.g., database query). As an example, the query model can comprise a source data that is not directly loaded into memory. As another example, a portion of a dataset can be loaded into memory for processing, while a query can be used to link to data that is not directly loaded into memory. As a further example, an aggregated query result can be presented to a user interface. In an aspect, the dataset that is linked, but not loaded into memory, can be part of the associative user experience, whereby the user can navigate both the in-memory data and the linked data associatively. By directly querying large data sources without a complicated extract, transform, load (ETL) process, users can access vast information sources to leverage data driven insights, to create more informed strategies, and to make better decisions. The approach of leveraging one or more of in-memory data and linked data alleviates data silos, giving users the data they need when they need it, and without time or productivity drains. Users can continue to explore information freely rather than being confined to a predefined path of association and analysis.

Traditionally, software applications (e.g., a QlikView application) can use an in-memory data model to provide data visualization based on the data that is loaded in the data model. This in-memory data can be persistent for the application and can be updated via a batch mode data refresh. In an aspect, implicit (e.g., direct discovery) data is not loaded as part of the in-memory data model. Instead, queries are run from an interface. Once a query is executed, the implicit data can be calculated in the back-end database and an aggregated result can be presented. However, the implicit data is not directly loaded as part of the in-memory data model. In another aspect, the queries can be generated from the data objects. The results of the queries are specific to each data objects and once the object is deleted, that direct discovery data specific to that object will not be available in the memory. In a further aspect, non-implicit direct discovery data can be part of the in-memory data model to create the associations between the implicit direct discovery data and the data that is directly loaded in the in-memory data model.

In an aspect, associative analysis is available on the in-memory and the direct discovery data sets. As an example, associative analysis can be implemented on in-memory data and external or direct discovery data. As a further example, the analysis described in U.S. application Ser. No. 13/528,534, filed Jun. 20, 2012, U.S. Application Ser. No. 13/528,536, filed Jun. 20, 2012, and U.S. application Ser. No. 13/528,575, filed Jun. 20, 2012, hereby incorporated herein by reference in their entirety, can be implemented on in-memory and direct discovery data in accordance with the present disclosure.

The present methods and systems allow users to leverage any data useful for analysis without scalability limitations. Conventionally, data discovery is reliant on a complete dataset to be loaded in memory for the user to analyze the data through the user interface. The amount of data that can be analyzed in real-time is limited by the amount of available memory and processing power. With the emergence increasingly large dataset, there are more situations where users desire to analyze large data volumes directly.

The present methods and systems enable users to perform data discovery and visual analysis against any amount of data, regardless of size. With the introduction of this unique hybrid approach, users can associate data stored within various data sources directly alongside additional data sources stored within the in-memory model. For example, the present methods and systems can seamlessly connect to multiple data sources together within the same interface (e.g. Teradata to SAP to Facebook), thereby allowing the user to associate data across the various data sources (e.g., data silos).

In an aspect, the present methods and systems enable users to navigate and interact with data via one or more methods. For example, within the script editor a new syntax is introduced to load data in a direct discovery or linked table form. Traditionally the following syntax is required to load data from a database table:
    Fact:
      LOAD ProductKey,
        OrderQuantity,
        SalesAmount;
      SQL SELECT ProductKey,
        OrderQuantity,
        SalesAmount FROM
   AdventureWorksDW2008R2.dbo.FactInternetSales;
To invoke the direct discovery or linked table method "SELECT" can be replaced with "LINKED," as illustrated below
Fact:
LOAD ProductKey;
SQL LINKED ProductKey
FROM
   AdventureWorksDW2008R2.dbo.FactInternetSales;

As a further example, within a script editor a new syntax can be introduced to connect to data via direct discovery. Traditionally the following syntax is required to load data from a database table, as illustrated in FIG. 2. To invoke the direct discovery method, the keyword "SQL SELECT" can be replaced with "DIRECT SELECT," as illustrated in FIG. 3.

In the example illustrated in FIG. 3, column CarrierTrackingNumber and ProductID can be represented as symbol tables for user selections. Symbol tables can be created by using the distinct data values from in-memory fields and the non-implicit (explicit) direct discovery fields. As an example, one symbol table can be created for each field. Symbol tables can be used as reference tables allowing the associations between the in-memory data set and external data sets. Various columns can exist in the data table within the database including columns OrderQty and Price, for example. As such, OrderQty and Price fields can be defined as implicit fields. In an aspect, an implicit field can be a field that is processed on the meta level. As an example, the actual data of an implicit field resides only in the database, but the field may be used in software expressions such as sum, average, count, minimum value, or maximum value, or a combination thereof. Other functionality can be used as a software expression.

Figure 4A:
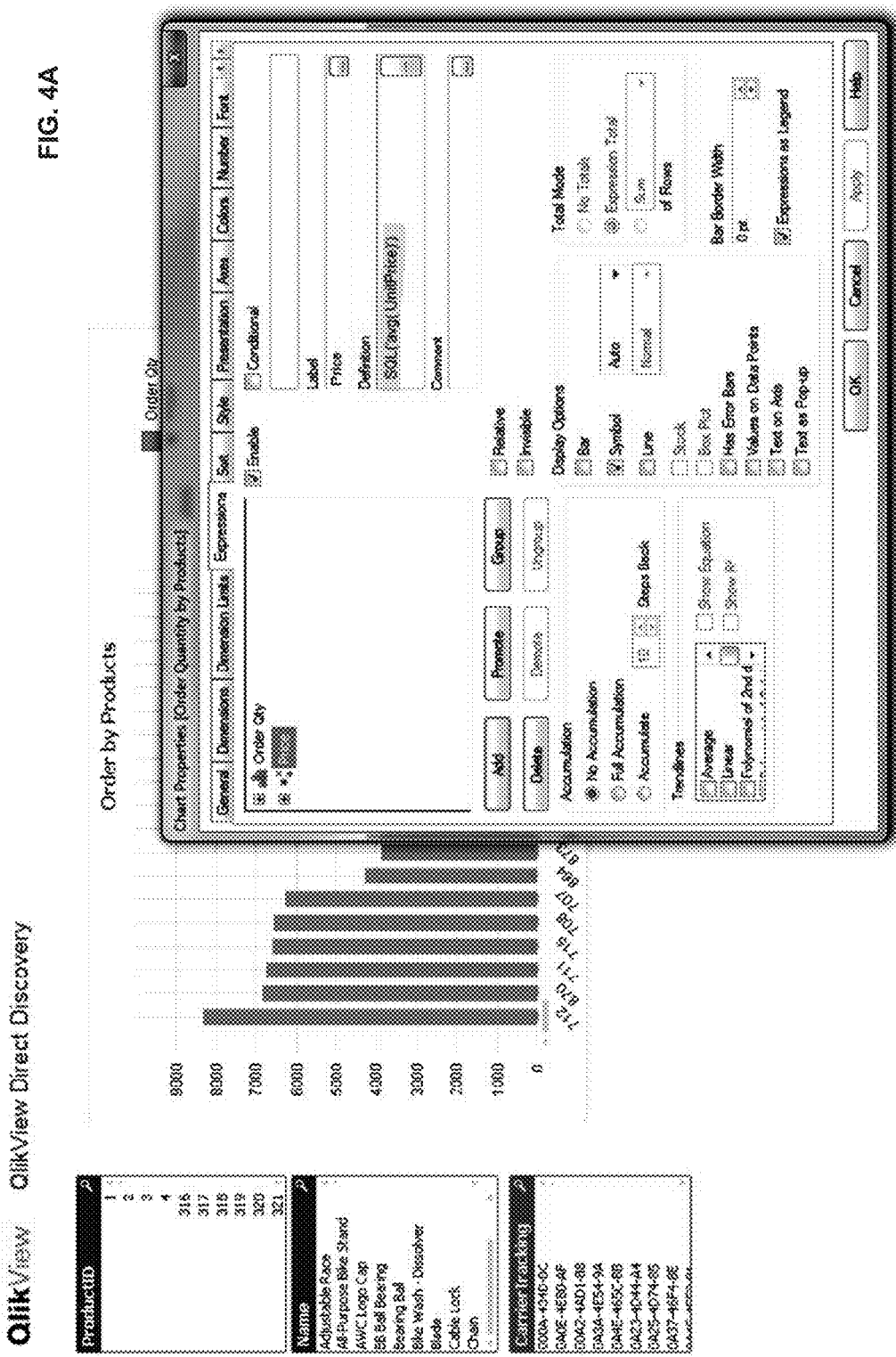
FIG. 4A is an exemplary data model interface.
Figure 4B:
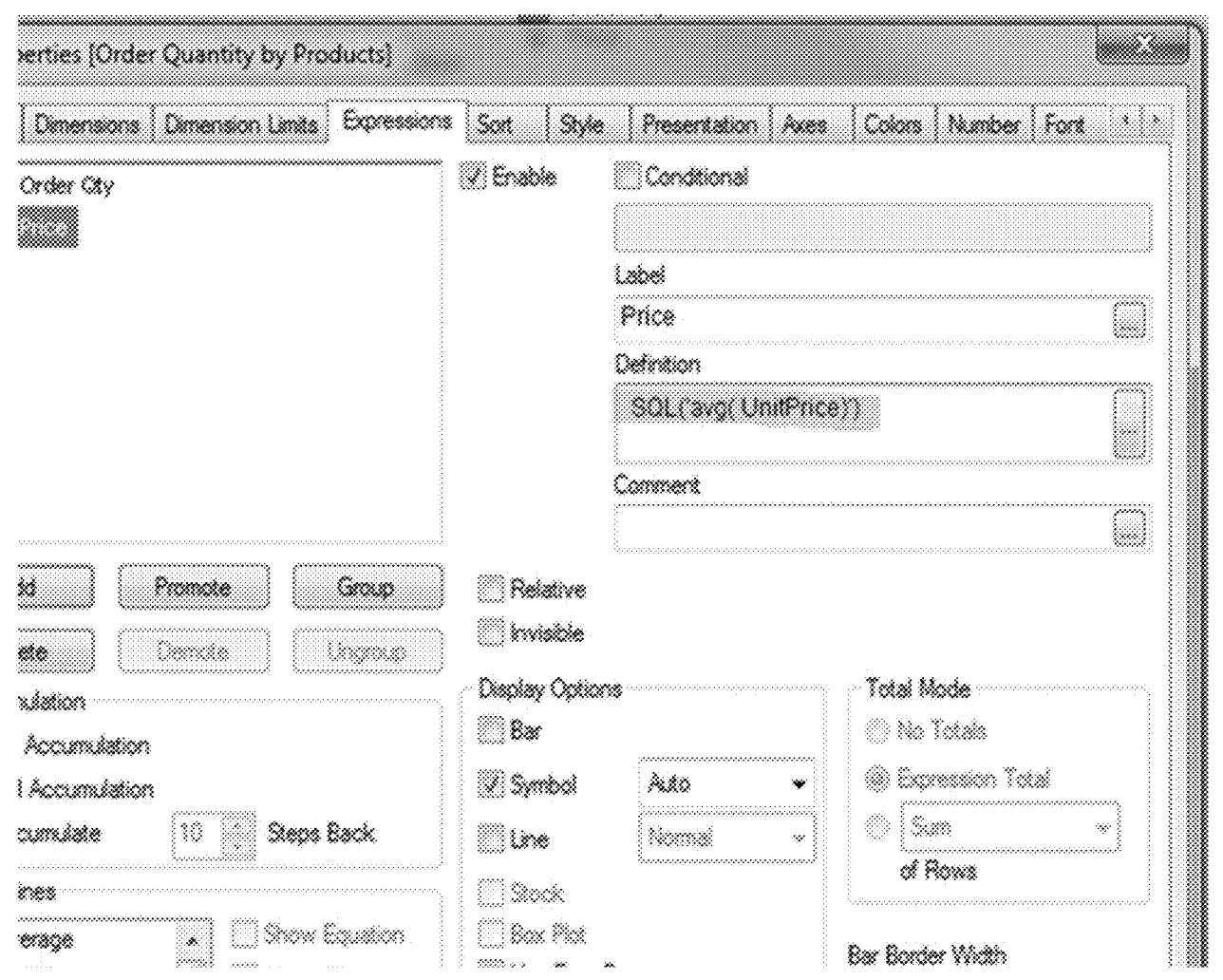

In an aspect, the load script can be configured to initiate an automatic loading of only the metadata of one or more data fields from the source table. Such data fields can be defined as implicit fields. In another aspect, implicit fields can be treated as any other field when the user works with expressions in particular software. For example, if the expression Count(Address) is used in a visualization such as a chart and the Address field is an implicit field, the database can implement the count expression. As a further example, implicit fields can provide support for aggregating in the database, while using the same expression syntax used via a local software. As such, the usage of the fields from the database can be transparent for the user. For more advanced usages or database specific tasks, the user can utilize the SQL(' ') function, as illustrated in FIGS. 4A-4B.

In an aspect, one or more data fields can be loaded into memory for selections purposes and/or one or more data fields can be joined/linked to in-memory data. Data fields that are not loaded, but rather joined/linked can be defined as implicit fields. As an example, a meta representation of the implicit fields can be retrieved at script load.

In another aspect, the script can be configured with a keyword such as IMPLICIT to designate one or more data fields as implicit data fields. As an example, implicit data fields and linked or direct discovery data fields can be made available from the database to an application or user interface. Accordingly, certain data fields of the database table can be excluded from user access or application access.

The following represent examples for defining implicit fields:

Example 1

Database fields can be identified as: Field1, Field2, Field3, Field4, and Field5. The load script can comprise the script: DIRECT SELECT Field1, Field3 FROM TableName. Accordingly, Field2, Field4 and Field5 can be defined as implicit fields.

Example 2

Database fields can be identified as: Field1, Field2, Field3, Field4, and Field5. The load script can comprise the script: DIRECT SELECT Field1, Field3 IMPLICIT Field2, Field4 FROM TableName. Accordingly, Field2 and Field4 can be defined as implicit fields.

Example 3

Database fields can be identified as: Field1, Field2, Field3, Field4, and Field5. The load script can comprise the script. DIRECT SELECT Field1, Field3 IMPLICIT Field2 as FieldB FROM TableName. Accordingly, FieldB (Field2 is renamed to FieldB) can be defined as an implicit field.

Figure 5:
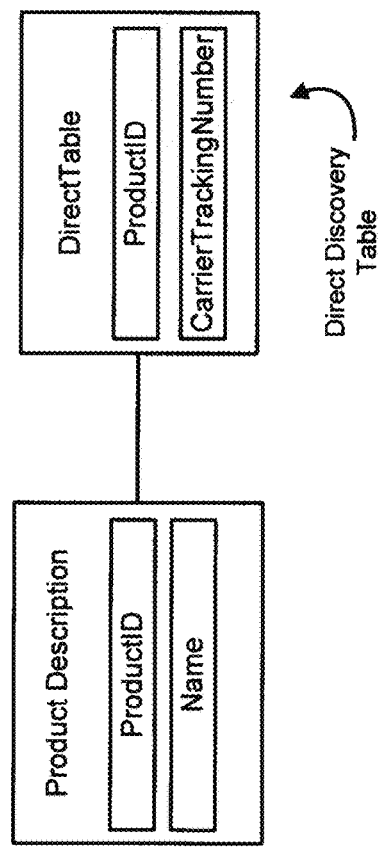
FIG. 5 is an exemplary data table association.

FIG. 5 illustrates a plurality of data tables. In an aspect, one or more of the data tables can comprise data fields. In another aspect, one or more of the data fields can comprise an identifier (e.g., column label). As an example, one or more of the data tables can be loaded into memory for processing, such as the ProductDescription data table. As a further example, one or more data tables can be defined as a query source (e.g., DirectTable) to enable data querying to the associated source database table, without having to load the entire table into memory.

Figure 6:
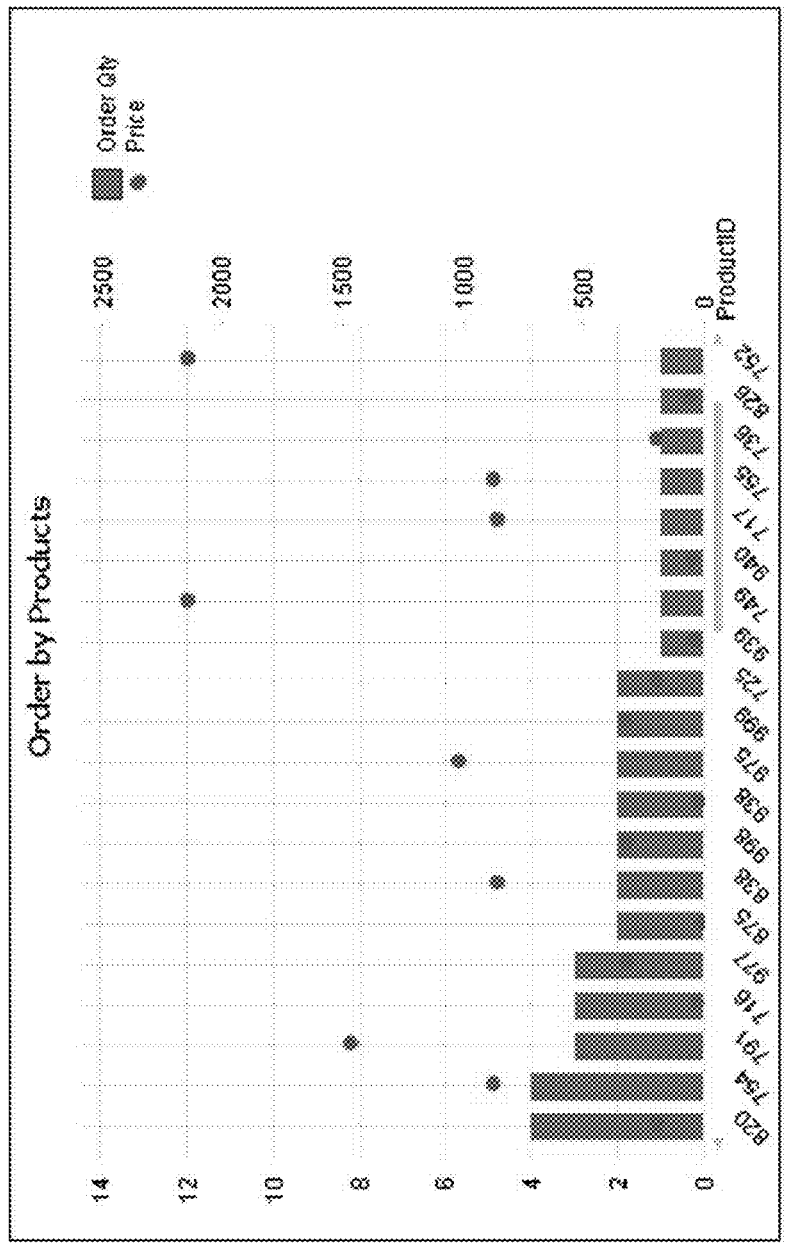
FIG. 6 is an exemplary visualization.

In an aspect, once the link between data tables is established, the data represented by the query source data table can be joined with the in-memory data using common field names. As shown in FIG. 5, the ProductDescription table can be loaded in memory and joined to the query source data with the ProductID field. Accordingly, the user can associatively navigate one or more of the query source data and in memory data sets, as illustrated in FIG. 6. As an example, users can associatively make selections on one or more data sets (query source or in-memory). As a further example, associations between the one or more data sets can be visualized seamlessly to the user.

In an aspect, in-memory data fields, direct discovery data fields, linked data fields, query source data fields, and/or implicit data fields can be represented via user interface. As an example, data fields specified with the DIRECT SELECT script statement, or functionally similar statement, can be loaded into a data model to create a symbol tables. Symbol tables can enable associations between in memory data fields and external data fields or query source data fields. Symbol tables can facilitate interaction with data that is not completely loaded into memory.

In an aspect, implicit fields can comprise the source data fields that are only loaded into a data model or application at the metadata level. As an example, the actual data values of implicit fields are not loaded into in-memory data model. Implicit data can, however, be used in formulae for aggregations and calculations made on the back-end database. Hence, implicit fields can allow the user to use the source data fields from the user interface for analytics creation. As the metadata of such implicit fields is loaded into an application, the user does not need to know if this is an in-memory or an implicit field. Accordingly, implicit fields can provide a seamless user experience.

In an aspect, non-implicit (explicit) fields can comprise source data fields having distinct data values loaded into the in-memory data model to create symbol tables. Non-implicit fields can be used to associate the in-memory data model data with direct discovery data (implicit or non-implicit). Non-implicit fields can also be used to display data values on a user interface for data selection purposes (e.g. as list boxes).

Figure 7:
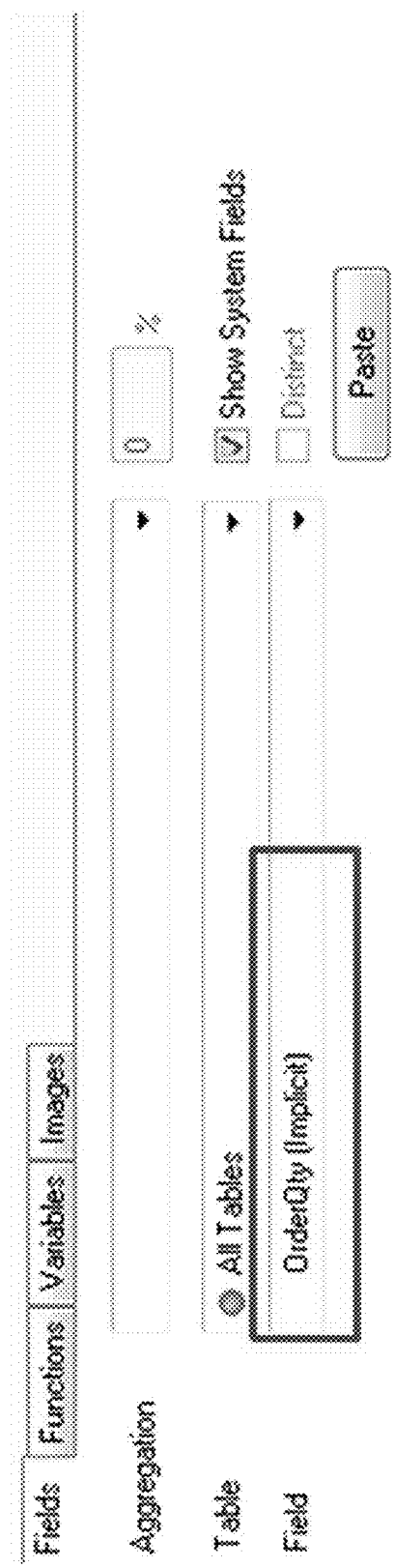
FIG. 7 is an exemplary field list.

In an aspect, in field list, additional information can be provided to notify the user that the field is an implicit field, as illustrated in FIG. 7. Such notification can be useful information to a user in order to be selective of data fields.

Figure 8:
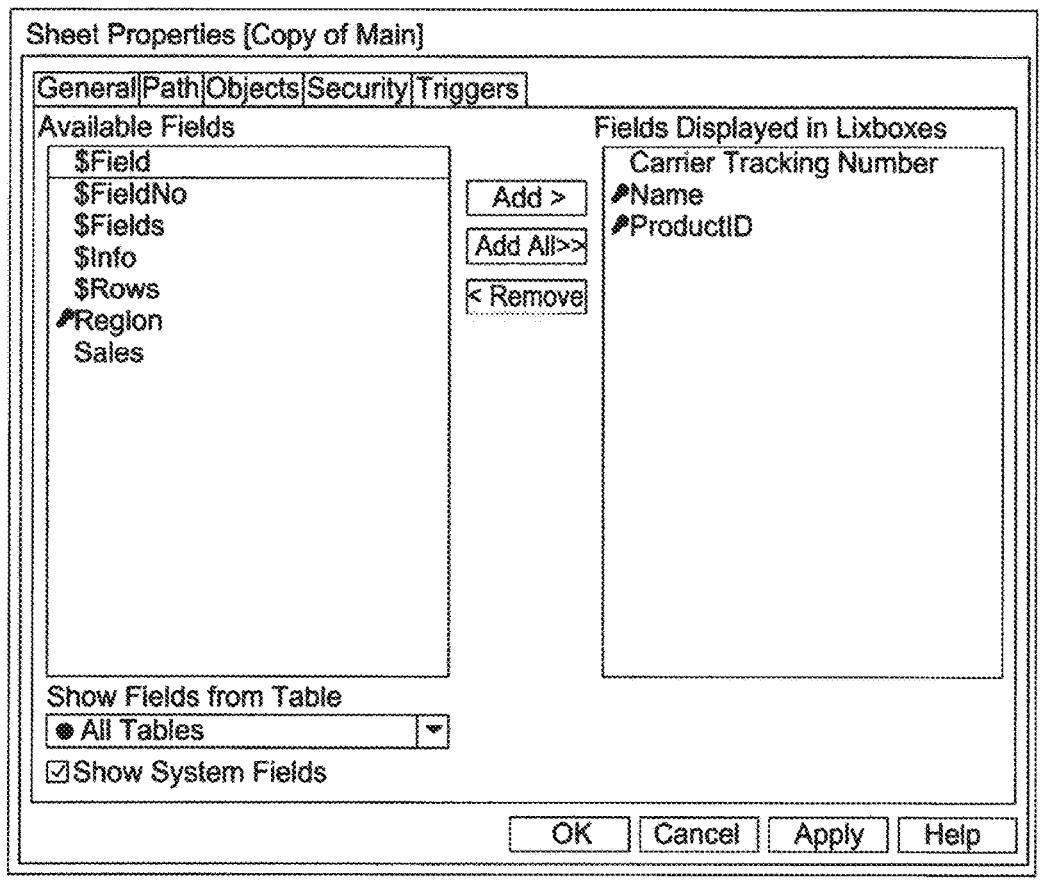
FIG. 8 is an example interface for generating list boxes.
Figure 9:
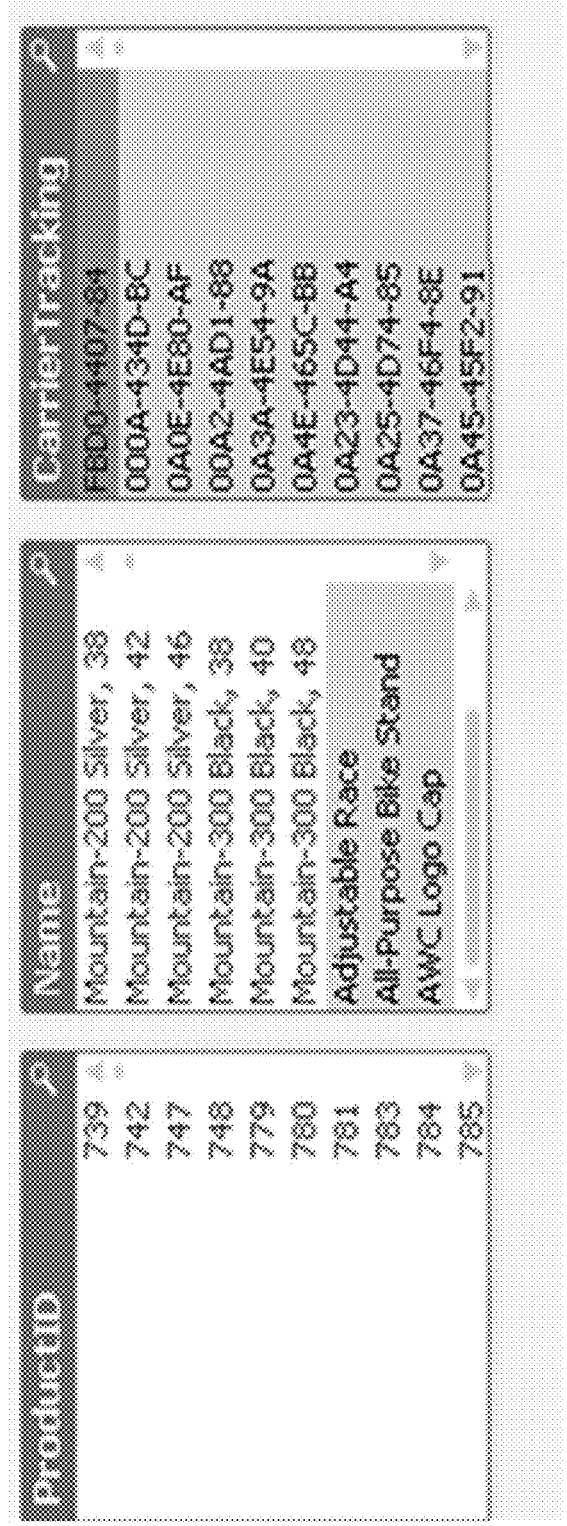
FIG. 9 is an exemplary group of list boxes.

In an aspect, one or more list boxes can be generated, as illustrated in FIG. 8. As an example, non-implicit data fields can be used in list boxes. As a further example, to achieve the associative navigation capability, an SQL query can be executed on one or more data sources when there is a selection made on the list box using data field that is not in-memory, as illustrated in FIG. 9.

Figure 10:
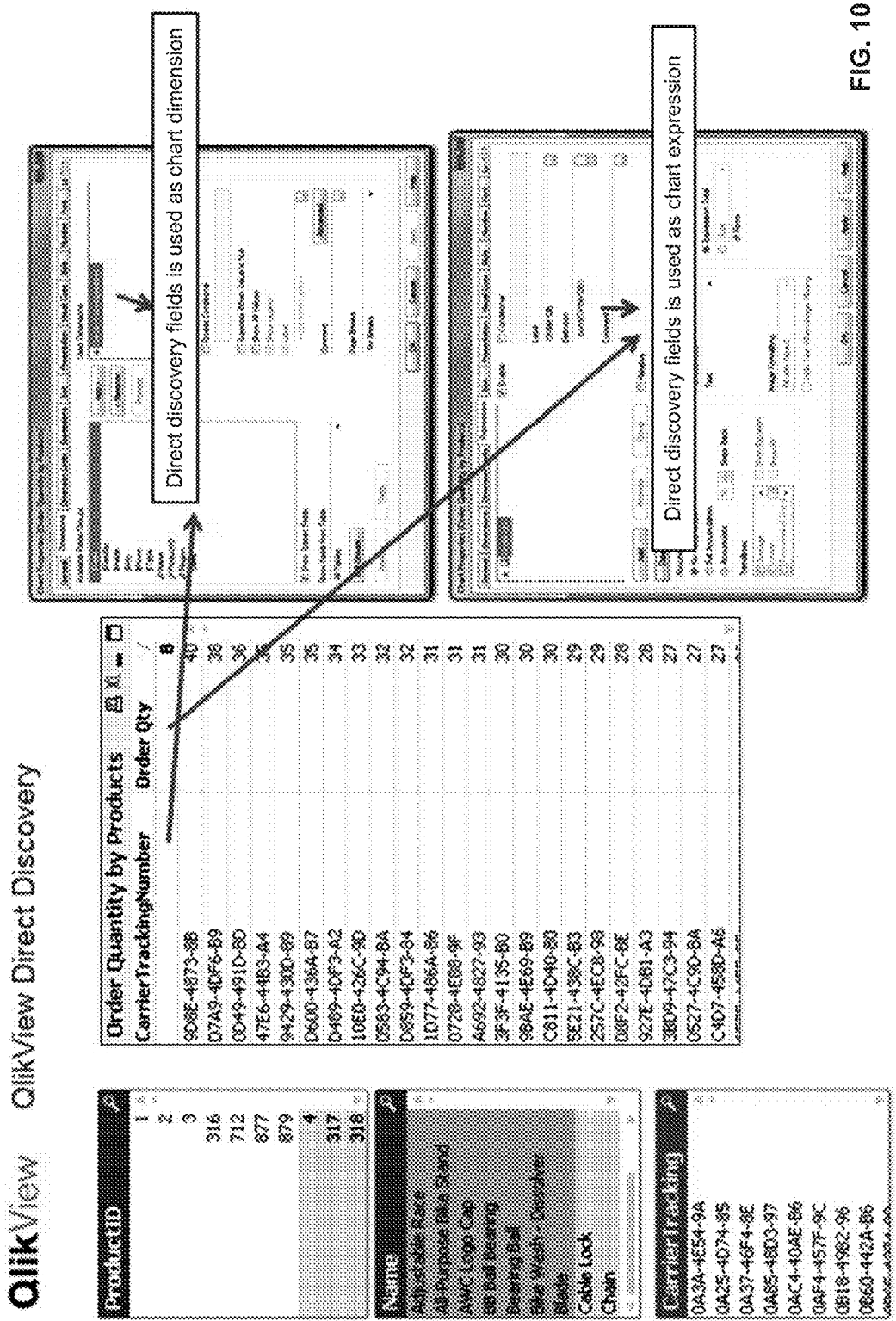
FIG. 10 is an exemplary visualization.

In an aspect, one or more visualizations (e.g., charts) can be generated. As an example, implicit data fields can be used in expressions relating to the visualization. As a further example, non-implicit data fields can be used as dimensions of the visualization. As illustrated in FIG. 10, the CarrierTrackingNumber field can be used as dimensions and the OrderQty field can be used in expressions.

In an aspect, for visualizations that use data fields that are not in-memory, aggregations and expressions can be implanted on the database. As an example, a second level aggregation or expression can be implemented at the visualization level once the database level aggregations are complete. As a further example, visualization functionalities can comprise interactive sorting, formatting, visual clues, dimension limits, and the like.

Figure 11:
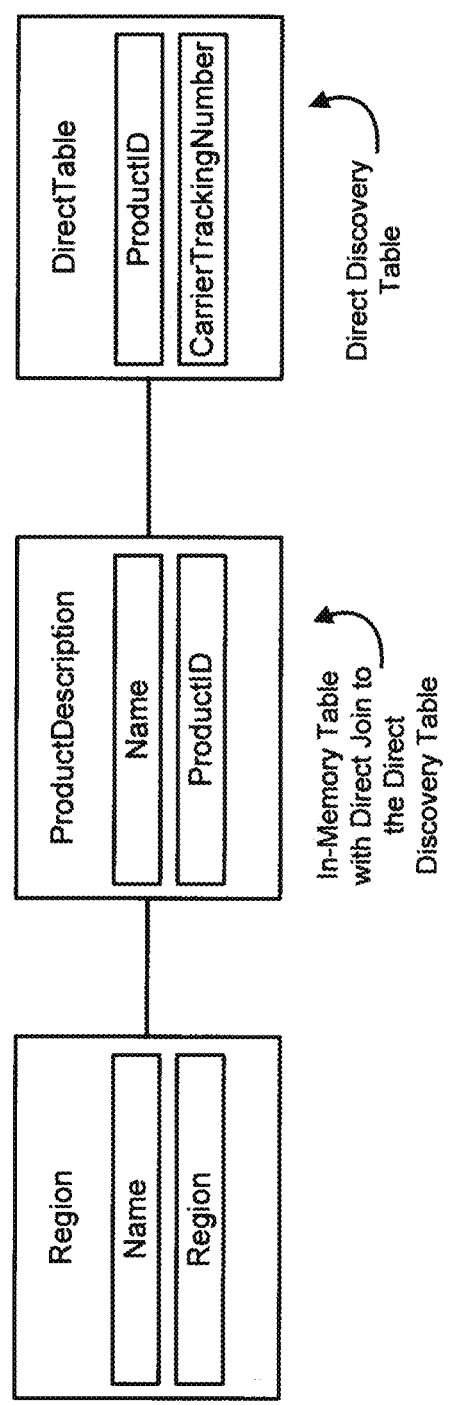
FIG. 11 is an exemplary data table association.
Figure 12:
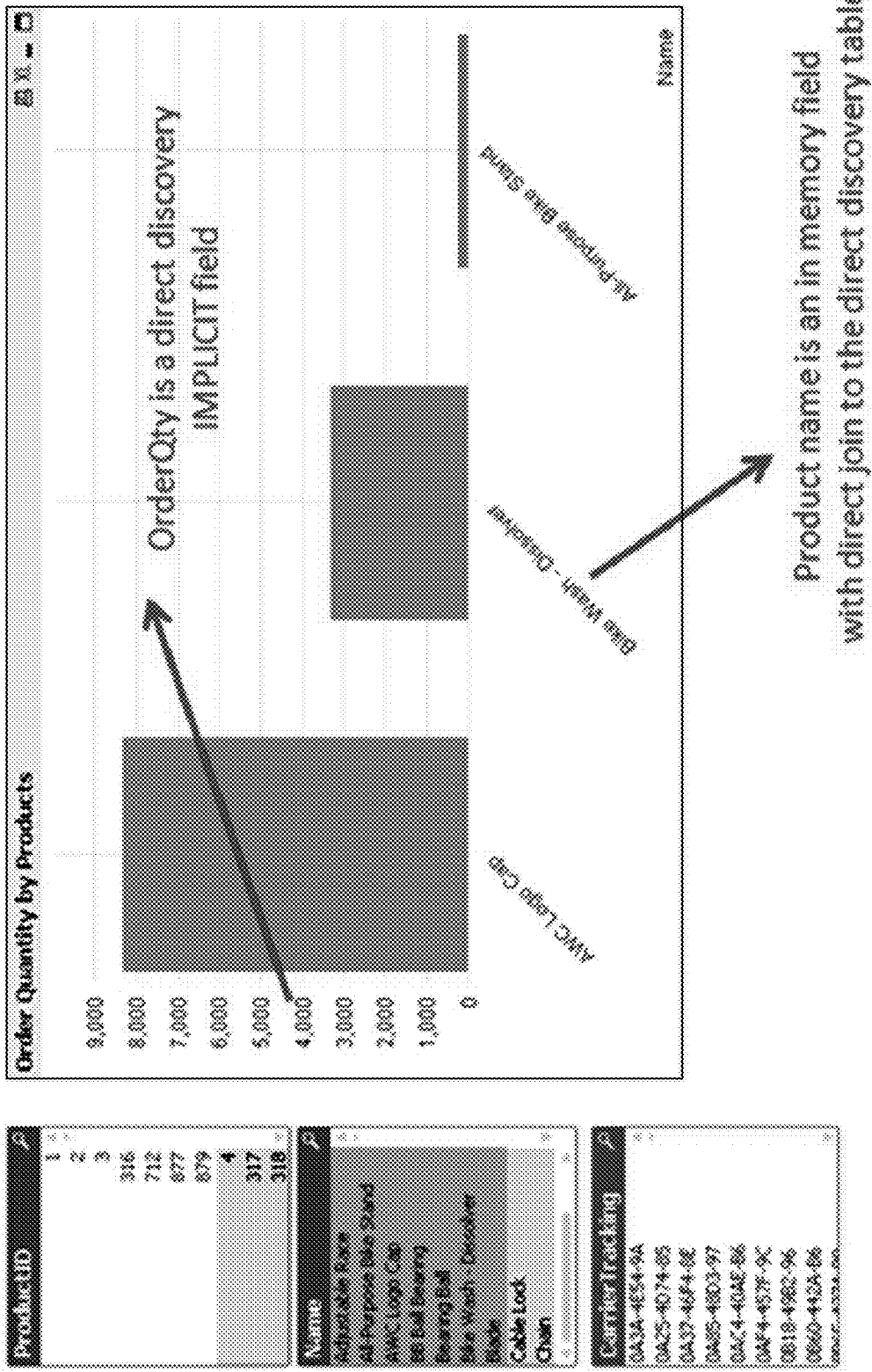
FIG. 12 is an exemplary visualization.

In an aspect, one or more visualizations can comprise a presentation of both in-memory and other data fields not in-memory. FIG. 11 illustrates an example of joined data tables, wherein ProductDescription is an in-memory table with a direct join to the data table that is not in-memory via the data field "ProductID." As a further example, visualization can be generated using the in-memory data field "Name" from the "ProductDecription" table with the "OrderQty" data field from the linked data table, as illustrated in FIG. 12.

Figure 13:
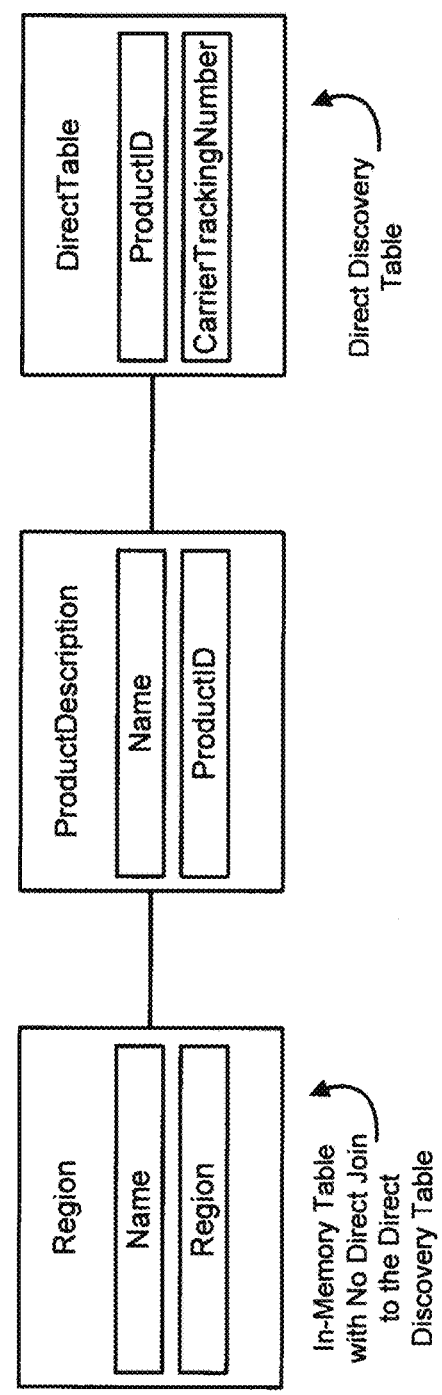
FIG. 13 is an exemplary data table association.
Figure 14:
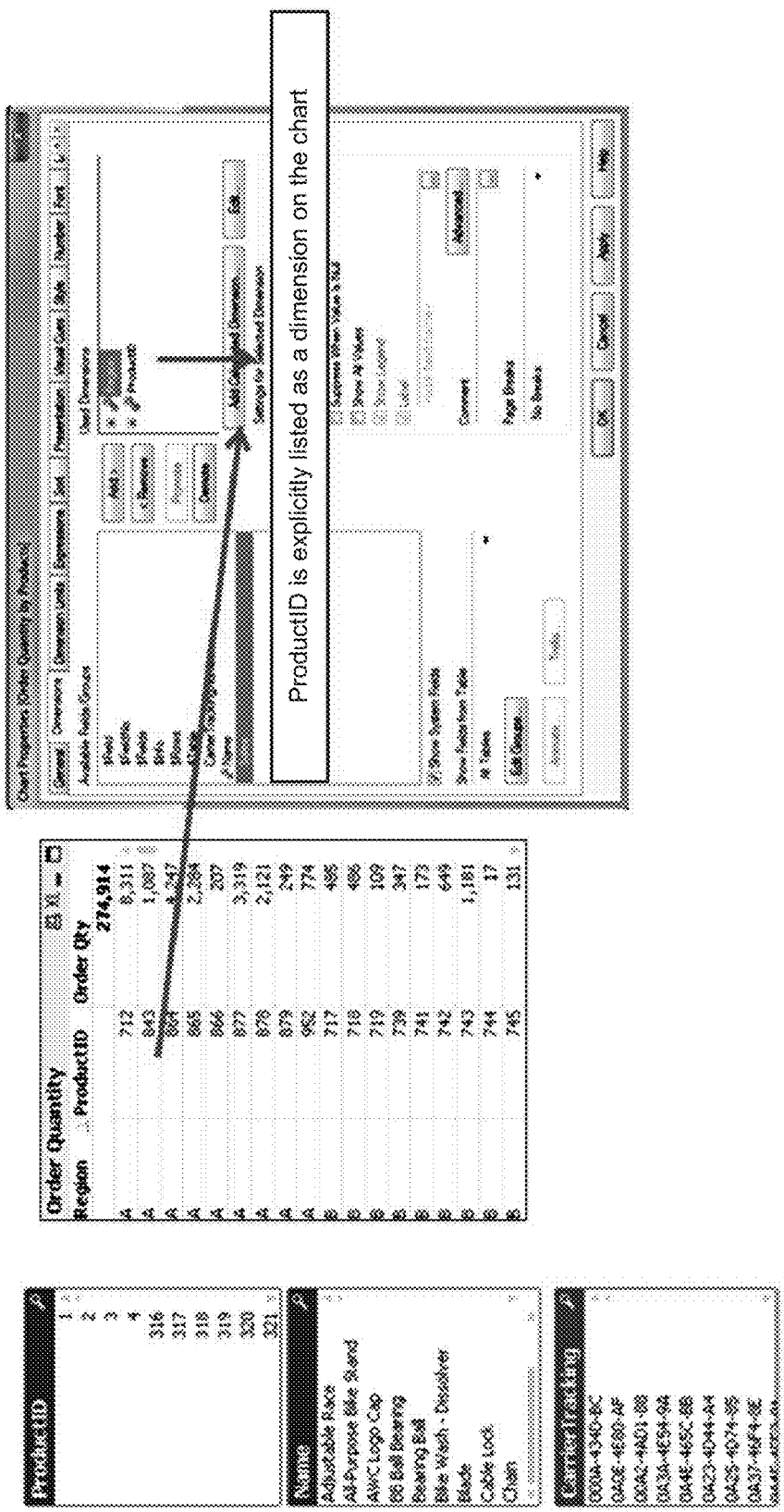
FIG. 14 is an exemplary visualization.
Figure 15:
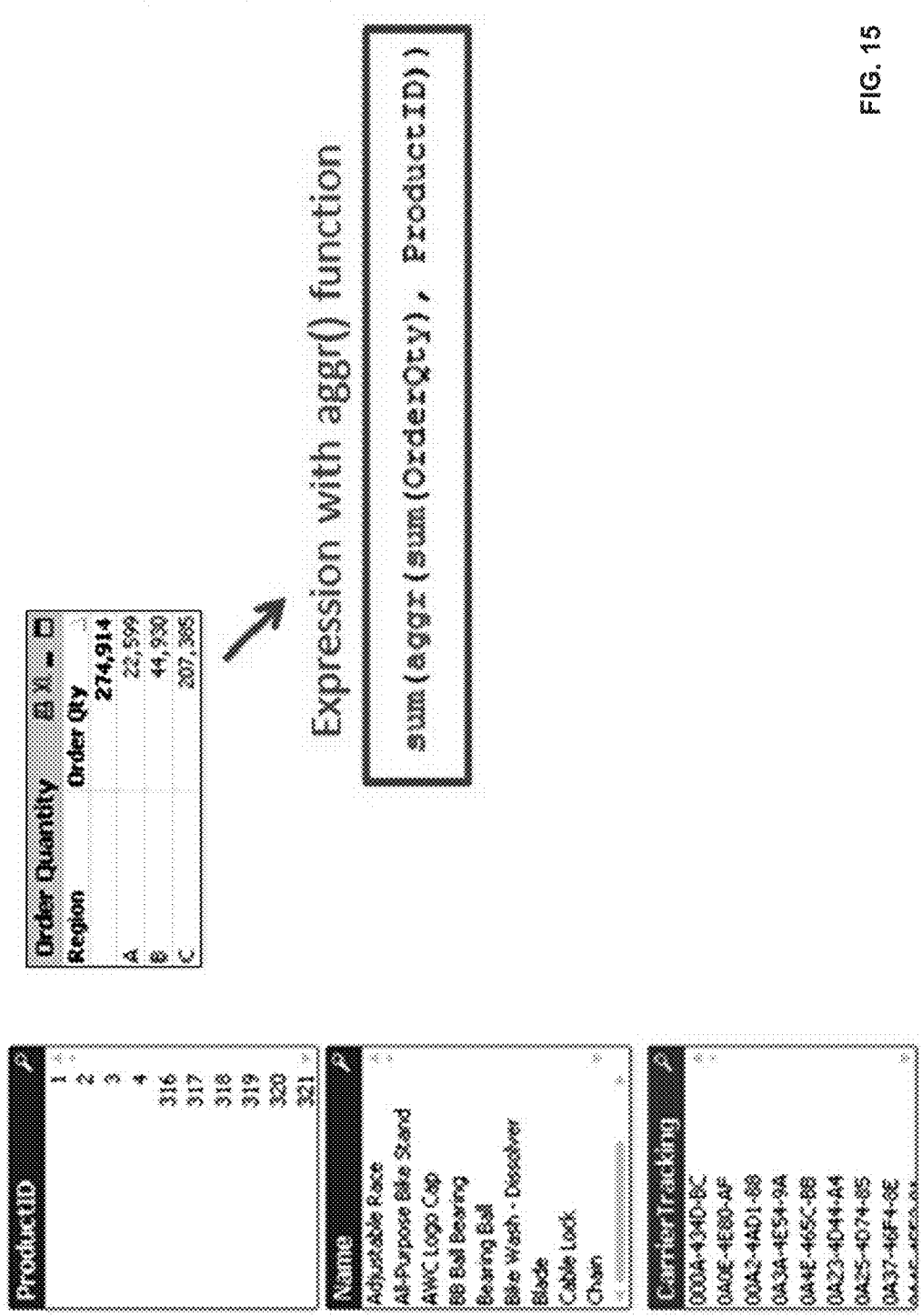
FIG. 15 is an exemplary visualization.
Figure 16:
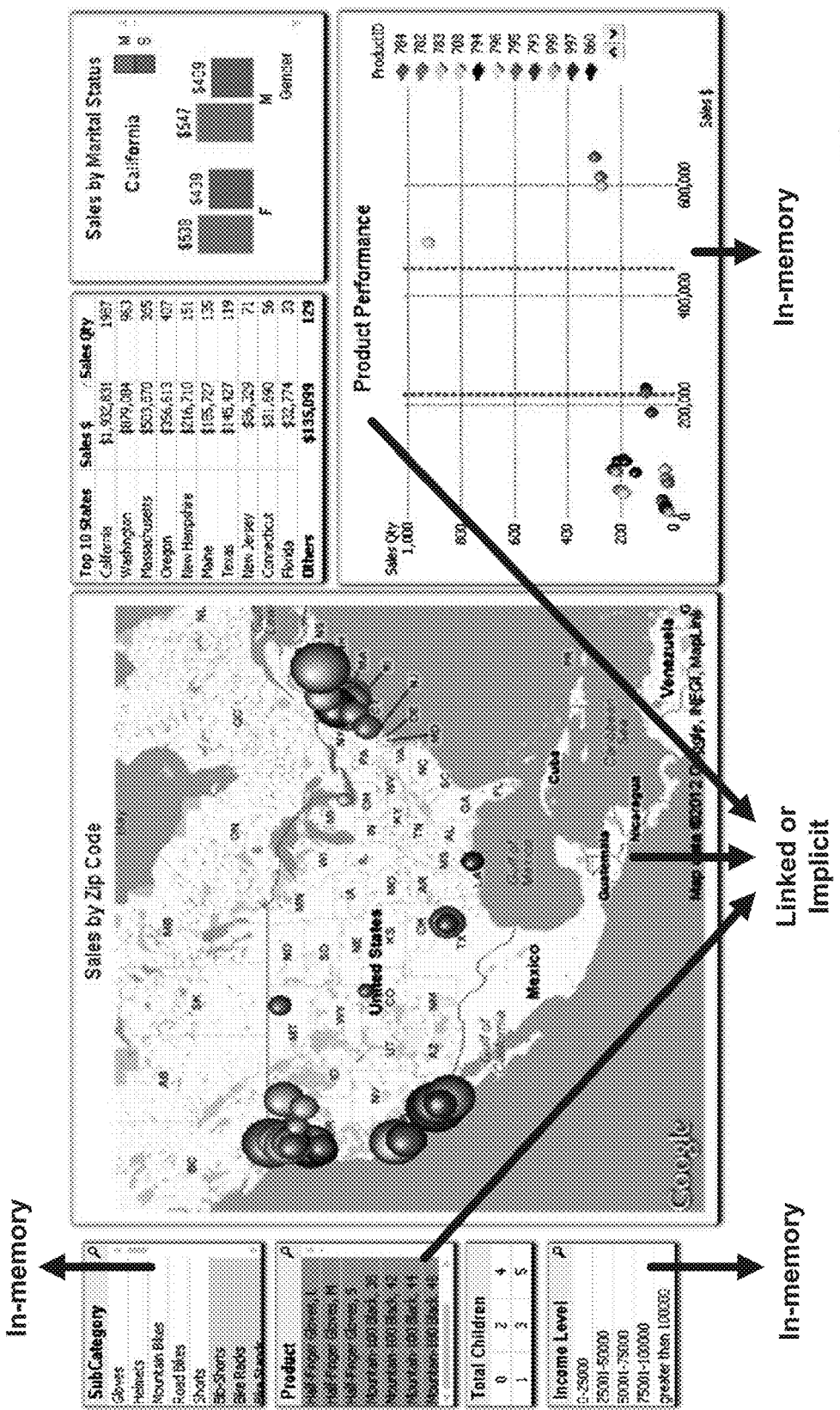
FIG. 16 is an exemplary visualization.
Figure 17:
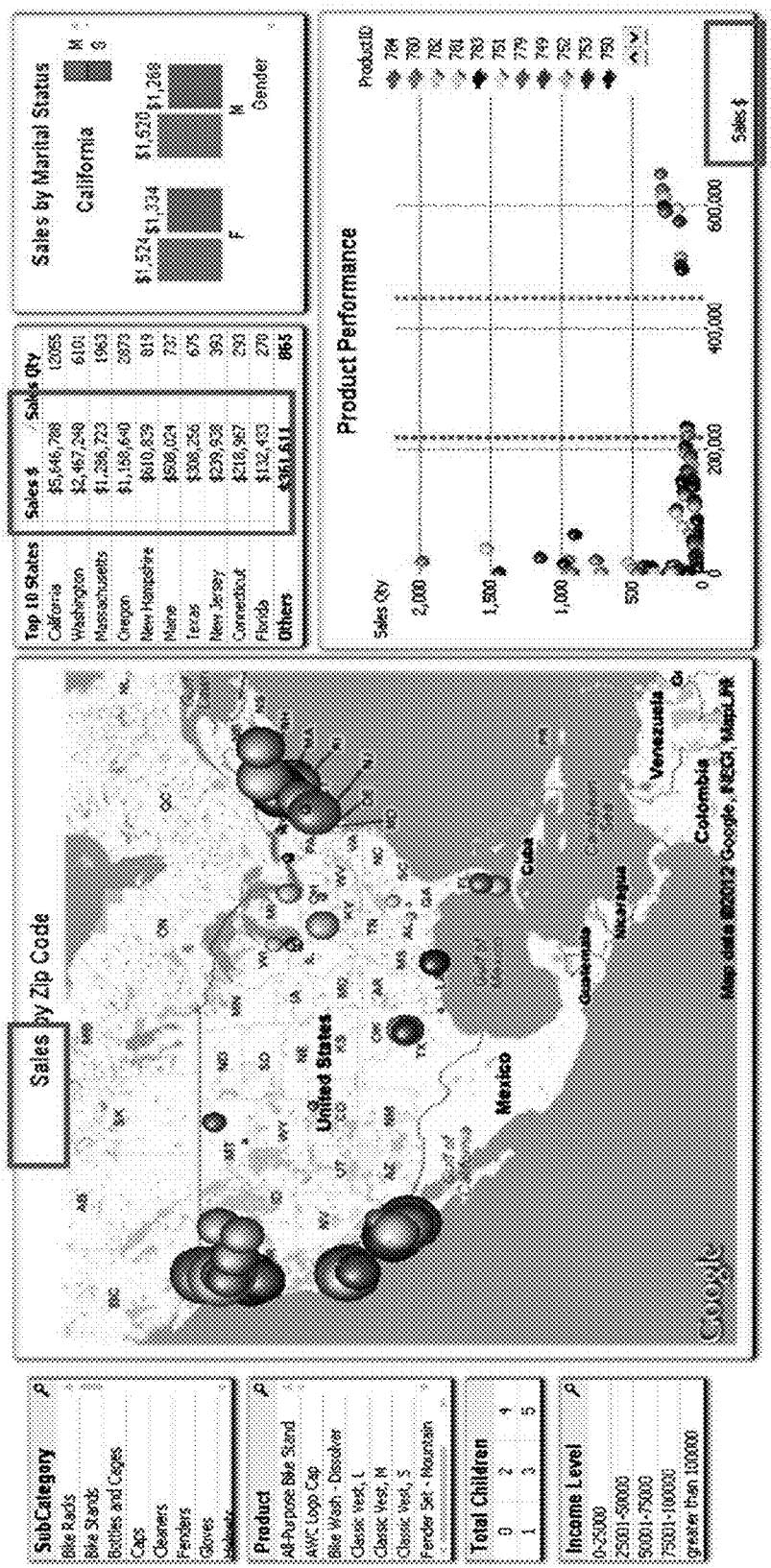
FIG. 17 is an exemplary visualization.
Figure 18:
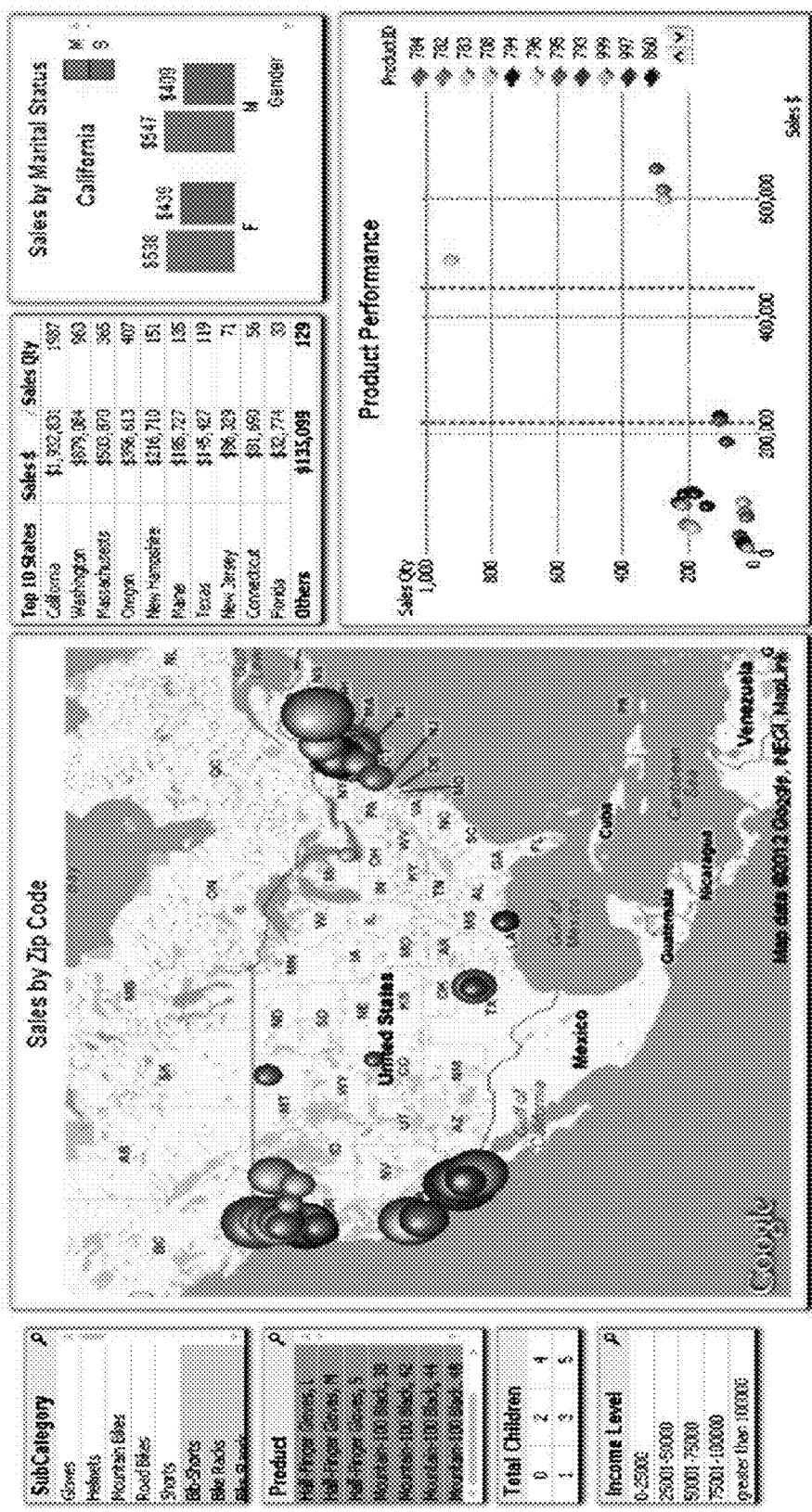
FIG. 18 is an exemplary visualization.
Figure 19:
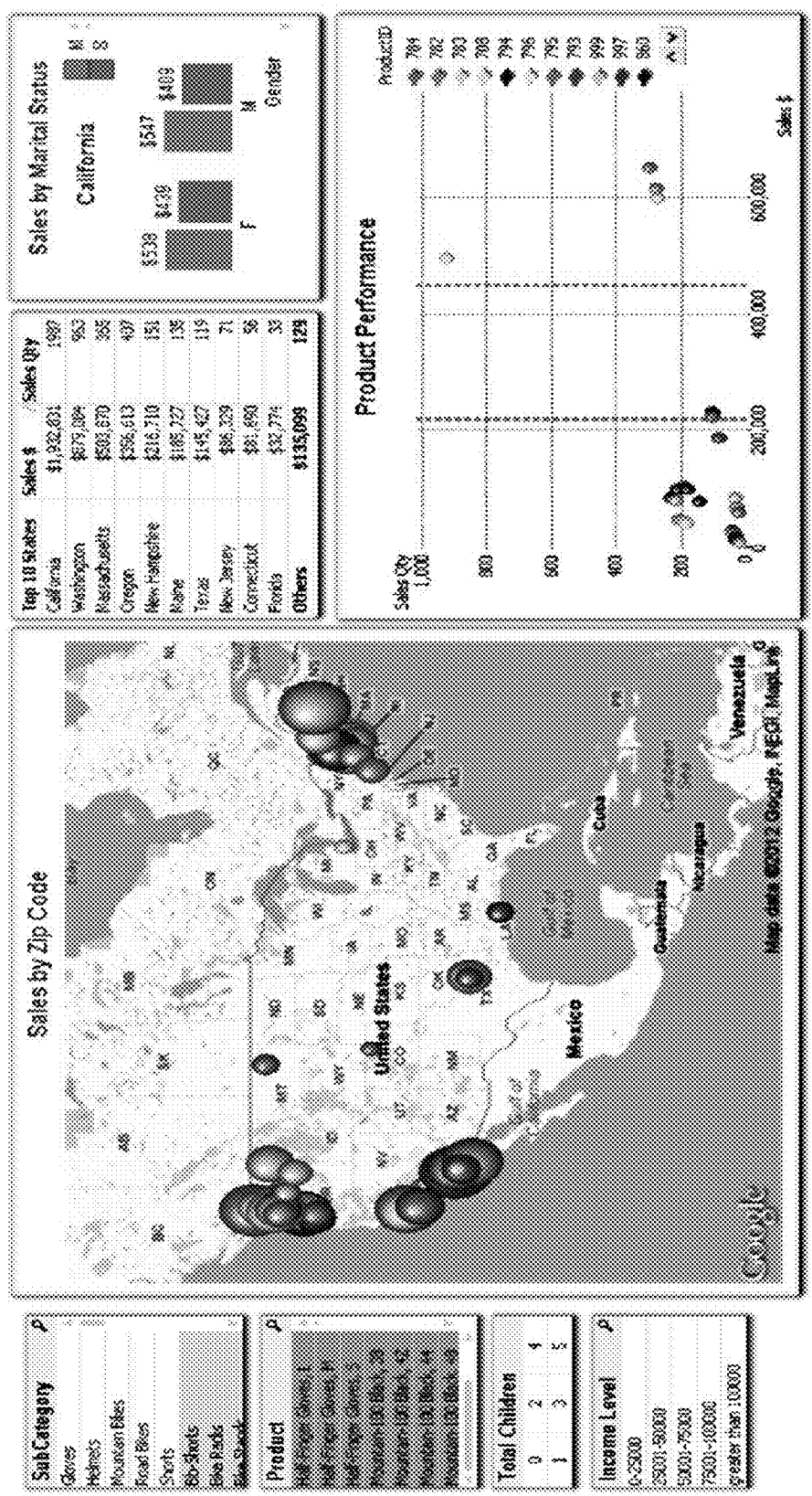
FIG. 19 is an exemplary visualization.

FIG. 13 illustrates an exemplary data table relationship, wherein the "ProductDescription" and "Region" data tables are in-memory data tables. As an example, the "Region" data table has no direct join to the data table "DirectTable." As a further example, the "ProductDescription" can be joined to the "DirectTable" table with the liked data field "ProductID." Accordingly, visualization can be generated to present Order Quantity (an implicit data field) by Region. As an example, the "ProductID" data field can be used in the visualization as another dimension, as illustrated in FIG. 14. As another example, an aggr( ) function can be used in the expression with the dimension "ProductID," as illustrated in FIG. 15. As a further example, aggregations for the linked fields or implicit fields can be implemented on the database.

FIG. 16-19 illustrate exemplary visualization according to aspects of the present disclosure. FIG. 16-19 illustrate visualizations representing in-memory and linked or implicit data fields. Users can associatively navigate on various data sets; make selections on various data sets; and visualize the associated data as well as the unassociated data.

Figure 20:
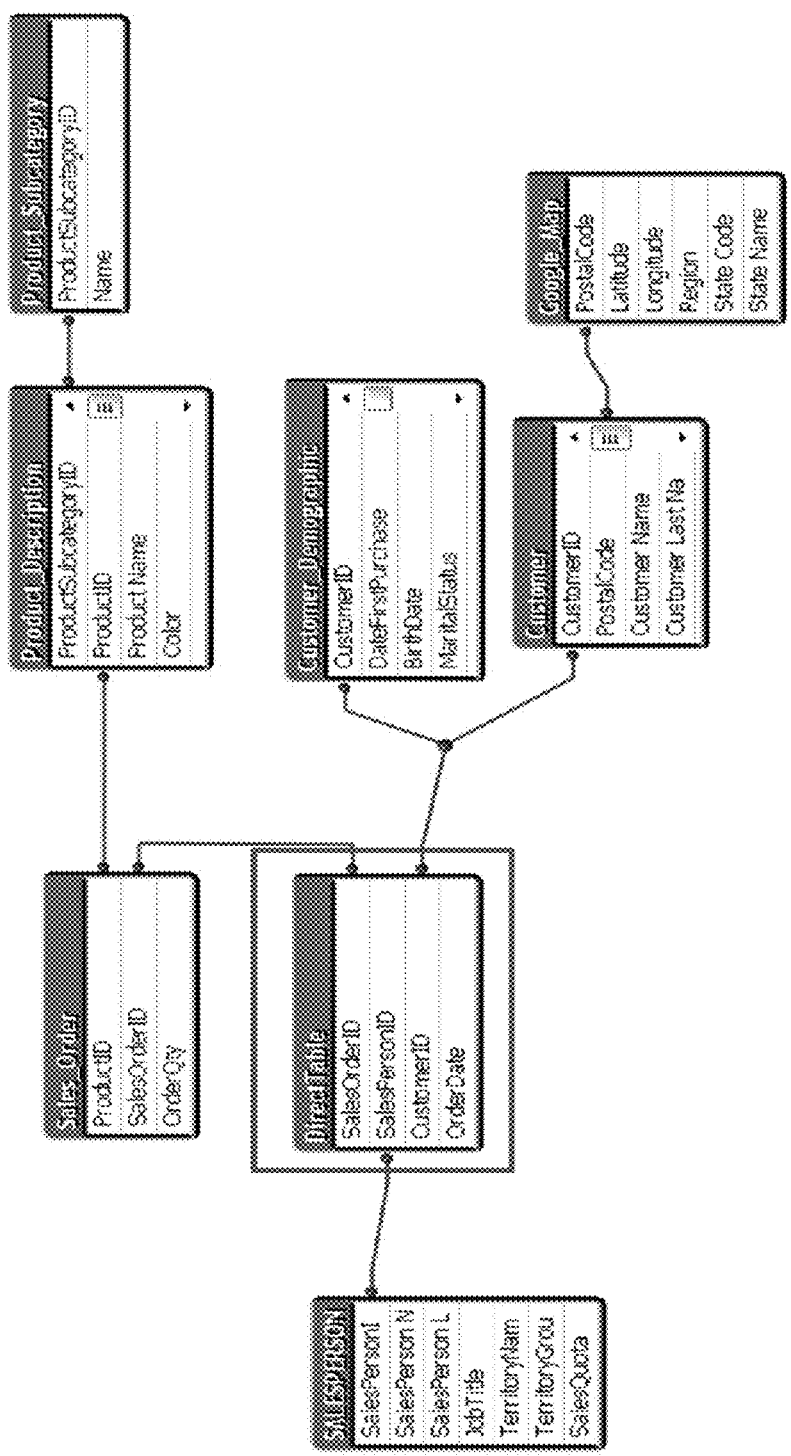
FIG. 20 is an exemplary data table association.

FIG. 20 illustrates a data table schema representing links between one or more data fields. Within the script editor, syntax can be introduced to connect to data in a direct discovery form. Certain data elements dictated by the script syntax are not to be loaded into the data model during the script reload process, but can still be made available for query purposes in data objects via the user interface. Analysis can combine in-memory and unloaded data in an associative way.

In an aspect, various data types can be supported by the systems and methods of the present disclosure. Where specific data formats need to be defined, the load script can be configured to define the specific format. For example, the "SET Direct . . . Format" syntax can be used, as shown below:

SET DirectDateFormat='YYY-MM-DD';

In an aspect, the systems and methods of the present disclosure can be implemented with SQL compliant data sources. As an example, the following data sources can be supported: ODBC/OLEDB data sources (all ODBC/OLEDB sources are supported, including SQL Server, Teradata, and Oracle), custom connectors which support SQL such as Salesforce.com, SAP SQL Connector, custom QVX connectors for SQL compliant data stores, and the like. Other data sources can be supported.

In an aspect, asynchronous, parallel calls can be made to the database by using a connection pooling capability. As an example, the load script syntax to setup the pooling capability can be similar to the following syntax:

SET DirectConnectionMax=10;

Chart calculation time can be dependent on the performance of the underlying system. In an aspect, the object calculation time limit setting can be configured to allow enough time for the visualization/chart to receive query results from the data source, as illustrated in FIG. 21. In an aspect, max symbols settings can be used to set the number of data points to be displayed visualizations. Database queries can return many distinct values. Accordingly, to display the desired number of data points via visualizations, the max symbol settings can be configured, as illustrated in FIG. 21.

Figures 22, 23:
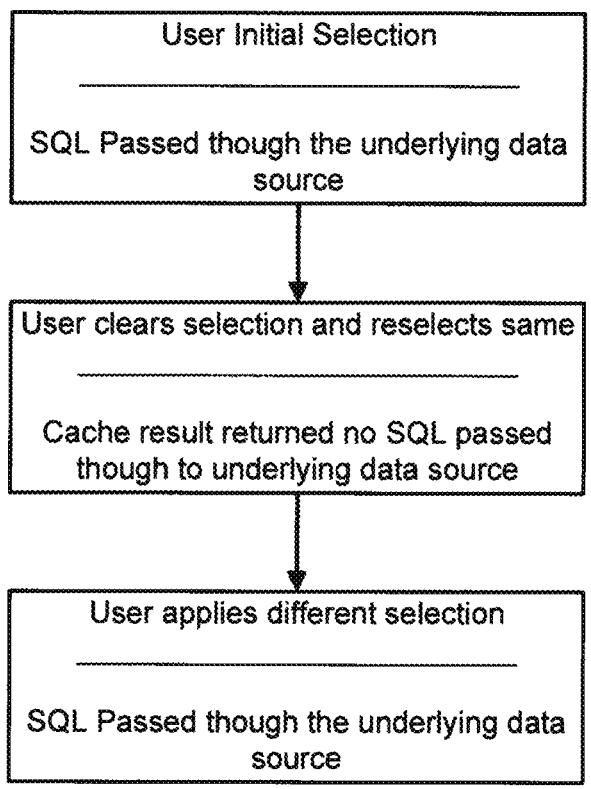
FIG. 22 is exemplary load script syntax.
FIG. 23 is a flow chart of an exemplary process.

In an aspect, to maximize the overall user experience, caching can be used. As an example, when the same types of selections (e.g., in-memory, linked data fields) are made, the resultant query can be made from cache, as illustrated in FIG. 22. As a further example, cached result sets can be shared across various users. In an aspect, a time limit can be set on caching. As an example, syntax such as "STALE" can be used on the load script to set a caching limit on the query results. Once this time limit hits, the cache can be cleared.

Figure 24:
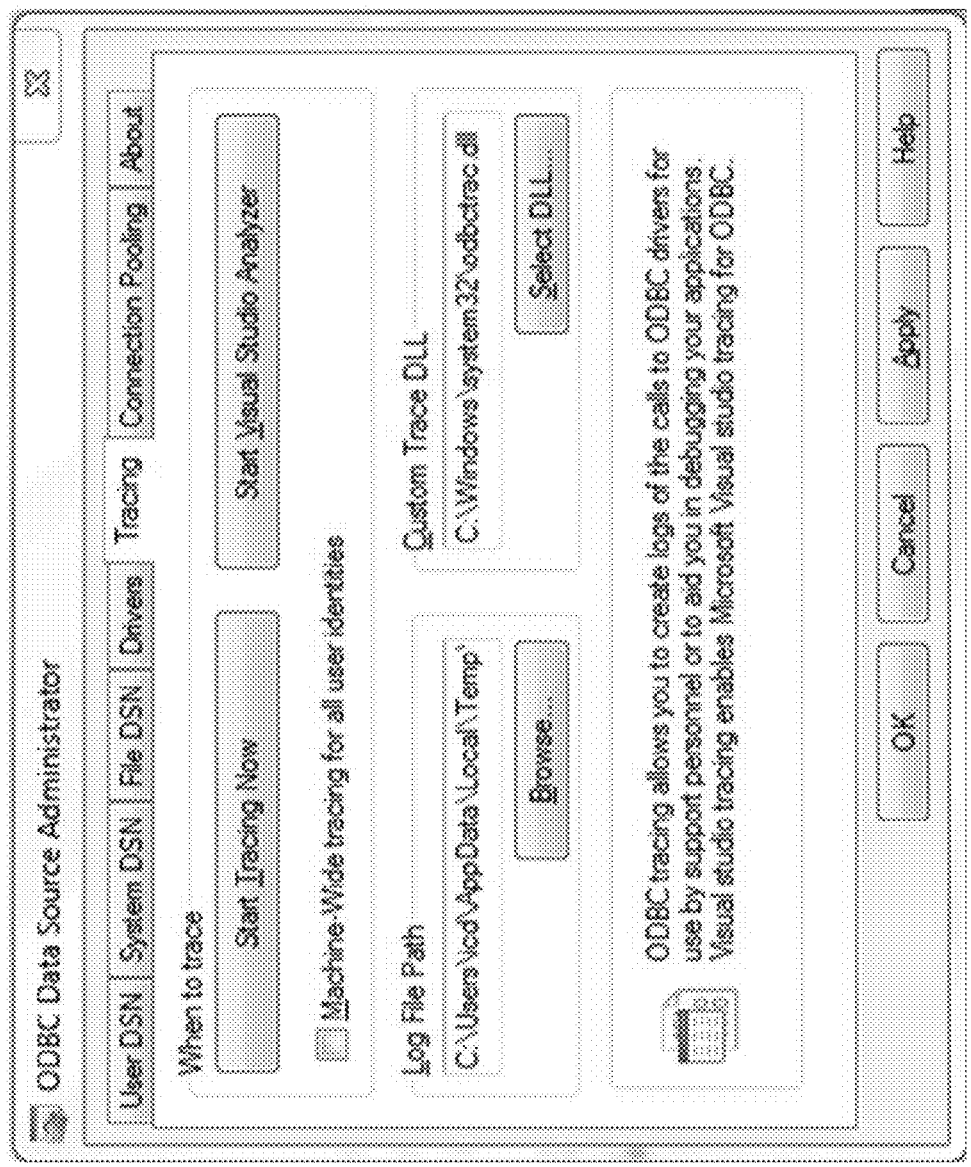
FIG. 24 is an exemplary data model interface.

In an aspect, a direct SQL statement can be passed to the underlying data source, as illustrated in FIG. 23. As such, the statement passed can be viewed through the trace files of the underlying connection. FIG. 24 illustrates an exemplary configuration for a standard ODBC connection.

In an aspect, one or more data sources can be queried regularly or incrementally based upon the most selected data values for one or more users. As an example, a change in the most selected data values (or in the associative data points) can be indicated to an associated user.

In an aspect, rules can be defined to provide notification when a requisite condition is met. As an example, the condition can be dynamic based on the in-memory data values. As a further example, a condition can be set up to notify the user when the return percent (%) on the top 10 products is higher than 35%. As such, the top 10 product information sets can be in-memory information that would be dynamic as data is updated. Other intelligent and rule-based notifications can be implemented.

Figure 25:
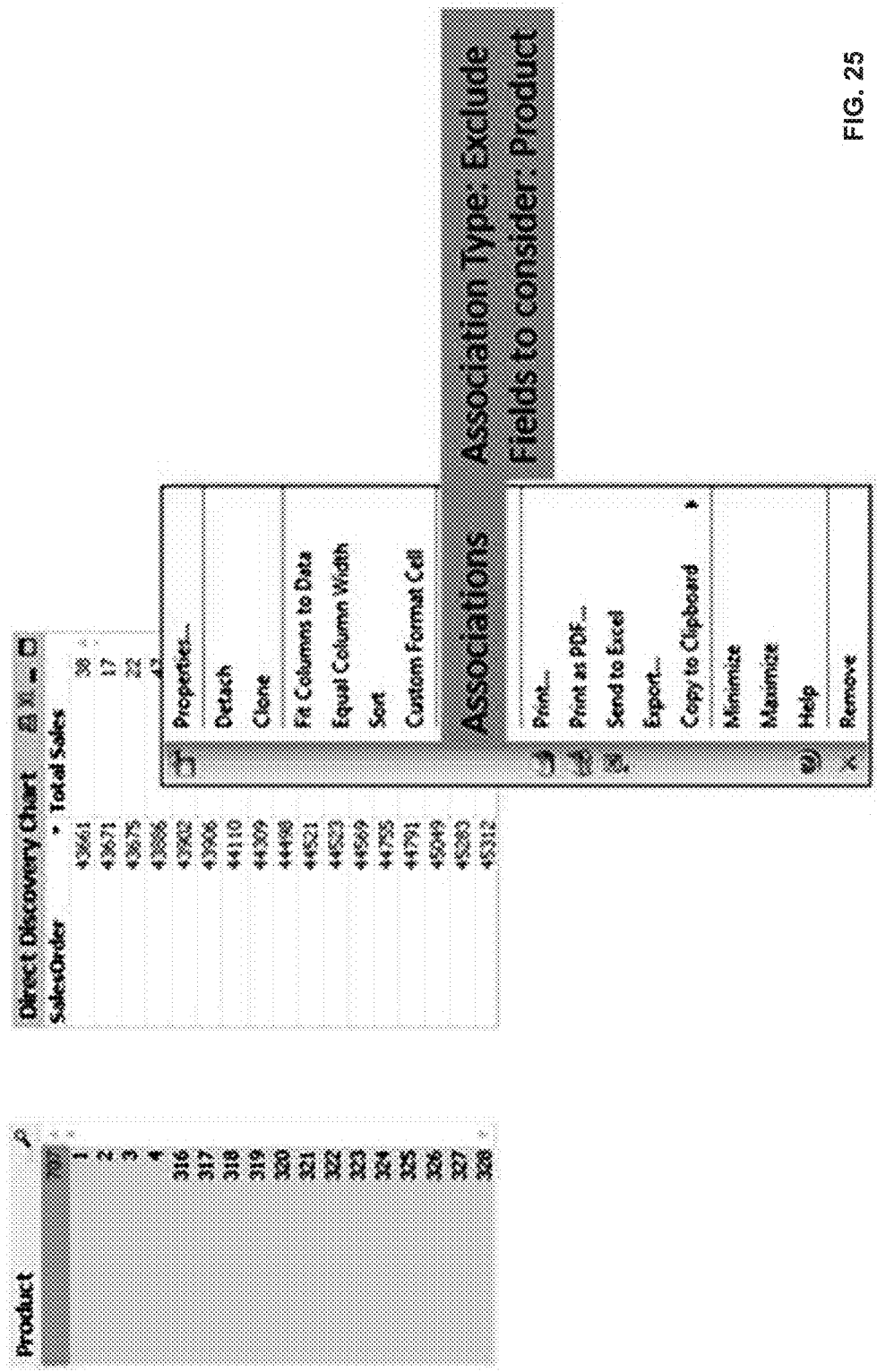
FIG. 25 is an exemplary data model interface.

In an aspect, the user can define interpretation of query results. For example, elastic direct discovery can allow the user to define interpretation of a result set in memory based on configurations. As another example, the user can define how the returned result set should be interpreted against the current selections in memory. As a further example, the user defines how the selection on product list box should be interpreted by indicating the Association Type as Exclude, as illustrated in FIG. 25.

In an aspect, the user can access the direct data sets (or query results) displayed on charts. This would allow the user to refer to the direct data sets on charts and be able to compare these different aggregated direct data sets (or query results) on the fly. The user can do intersection, exclusion, union type of analysis on these direct groups. In an aspect, with elastic direct discovery, aggregated data can be returned from a data source based on the dimensions on a destination chart. The returned data can be manipulated based on the dynamic associations that a user can define via a user interface.

Figure 26:
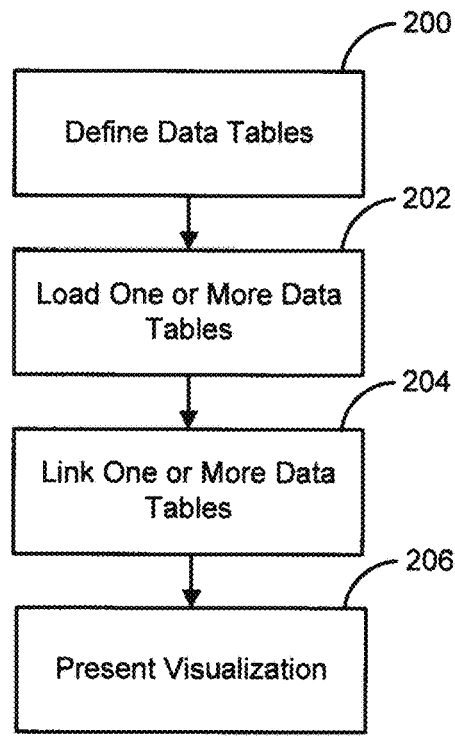
FIG. 26 is a flow chart of an exemplary method.

FIG. 26 illustrates an exemplary method for data management. In step 200, a plurality of data tables can be defined. In an aspect, one or more of the data tables can comprises a data field.

In step 202, a first data table of the plurality of data tables can be loaded in a first memory such as local memory. In an aspect, one or more data fields of the first data table can be associated with a second data table of the plurality of data tables. In another aspect, at least a portion of the second data table can be resident in a second memory. As an example, the first memory and the second memory can be remotely disposed relative to each other. As a further example, an expression, query result, and/or aggregation relating to the second data table can be loaded in the first memory.

In step 204, a portion of the first data table can be linked with a portion of the second data table. In an aspect, the portion of the second data table that is linked with the first data table can comprise implicit data fields. As an example, the linked portion of the second data table is not loaded in the first memory, thereby conserving processing resources. However, metadata associated with the second data table can be processed, as described herein. In certain aspect, all or portions of the second data table can be loaded in the first memory.

In step 206, a visualization of the first data table and the second data table can be presented. In an aspect, the visualization can comprise a representation of the linked portion of the second data table. In another aspect, the visualization can comprise an expression, query result, and/or aggregation relating to at least the second data table. In a further aspect, the visualization can comprise an expression using one or more implicit data fields of the second data field. As an example, the expression can comprise sum, average, count, minimum value, or maximum value, or a combination thereof. As another example, the expression can represent an aggregate of a portion of the first data table and a portion of the second data table.

Figure 27:
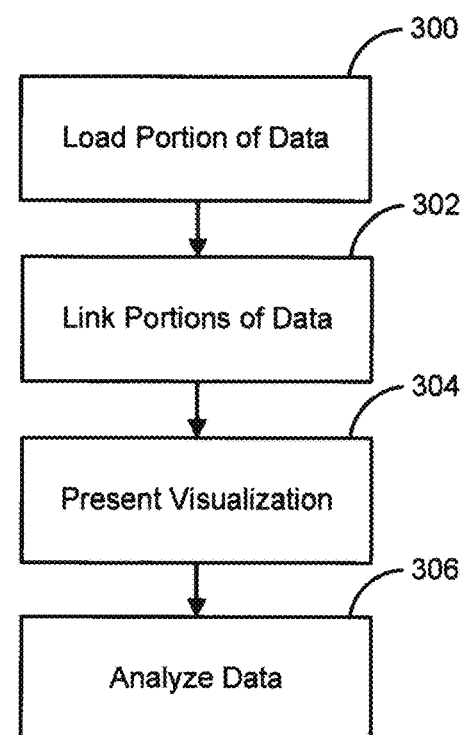
FIG. 27 is a flow chart of an exemplary method.

FIG. 27 illustrates an exemplary method for data management. In step 300, a first portion of stored data can be loaded in a first memory. In an aspect, a second portion of the stored data can be resident in a second memory. As an example, the first memory and the second memory can be remotely disposed relative to each other. As a further example, an expression, query result, and/or aggregation relating to the second data can be loaded in the first memory.

In step 304, the first portion of stored data can be linked with the second portion of stored data. In an aspect, the second portion of stored data that is linked with the first portion of stored data can comprise implicit data fields. As an example, the linked second portion of the stored data is not loaded in the first memory, thereby conserving processing resources. However, metadata associated with the second portion of the stored data can be processed, as described herein. In certain aspect, all or portions of the second portion of the stored data can be loaded in the first memory.

In step 306, a visualization of one or more of the first data and the second data can be presented. In an aspect, the visualization can comprise an expression, query result, and/or aggregation relating to at least the second data.

In step 308, one or more of the first data and the second data can be selected and/or analyzed. In an aspect, analysis of the first data can be implemented locally to the local memory and analysis of the second data can be implemented at least remotely from the local memory. In a further aspect, analyzing the second portion of stored data can comprise executing an expression using one or more implicit data fields of the second portion of stored data. As an example, the expression can comprise sum, average, count, minimum value, or maximum value, or a combination thereof. As another example, the expression can represent an aggregate first portion of stored data and the second portion of stored data.

Figure 28:
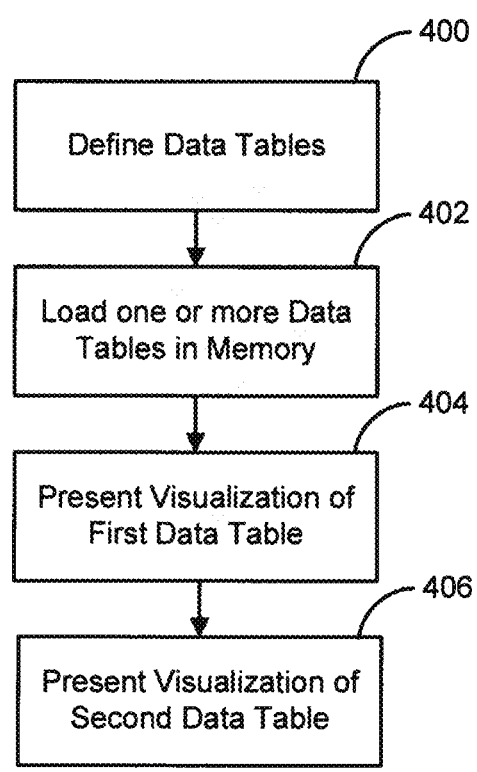
FIG. 28 is a flow chart of an exemplary method.

FIG. 28 illustrates an exemplary method for data management. In step 400, a plurality of data tables can be defined. In an aspect, one or more of the data tables comprises a data field.

In step 402, a first data table of the plurality of data tables can be loaded in a first memory. In an aspect, one or more data fields of the first data table can be associated with a second data table of the plurality of data tables. In another aspect, at least a portion of the second data table can be resident in a second memory. As an example, the first memory and the second memory can be remotely disposed relative to each other. As a further example, an expression, query result, and/or aggregation relating to the second data table can be loaded in the first memory.

In step 404, a visualization of the first data table can be presented. In an aspect, the visualization can comprise an expression, query result, and/or aggregation relating to at least the first data table.

In step 406, a symbol table representing the second data table can be presented. In an aspect, the symbol table can comprise an expression, query result, and/or aggregation relating to the second data table. In another aspect, the symbol table can be configured to facilitate interaction between a user and one or more implicit data fields of the second data table.

The systems and methods of the present disclosure enable users to leverage any data useful for analysis without scalability limitations. Users can perform visual analysis against any amount of data, regardless of size. Users can associate data stored within large data sources directly alongside additional data sources stored in-memory. For example, a user interface can seamlessly connect to multiple data sources, including, for example, Teradata®, SAP®, Facebook® and others, allowing the user to associate data across the data silos.

Users can leverage unique capabilities on large data sets, including: more thorough, unified analysis, enabling expanded analysis on large data sets; drill down to details stored in the big data sources from the in memory data sets (aggregated or granular); speed and ease of use; analysis of large datasets by leveraging the user experience with social, collaborative, and mobile capabilities.

The systems and methods of the present disclosure can optimize developers' productivity by making it easy for them to reuse components and develop solutions that extend, customize, and integrate the systems and methods of the present disclosure with other software on a variety of platforms.

The systems and methods of the present disclosure can be open and extensible. A standards- and web-based development environment can be provided with a set of well-documented development tools and application programming interfaces (API).

The systems and methods of the present disclosure can be configured as a single client that will work equally well on tablets and laptop or desktop computers—both online and while disconnected. The systems and methods of the present disclosure can leverage various web technologies (e.g., HTML 5 and CSS3 standards and the like).

The systems and methods of the present disclosure can be configured to adjust automatically to the capabilities of the user's device. Standardizing on a single client facilitates a streamlined platform for developers to create apps, give business users a consistent user experience across all devices and platforms, and simplify deployment and security management for IT professionals.

The systems and methods of the present disclosure can introduce new metaphors for user interaction and new techniques for creating data visualizations. Designers are able to ensure consistent style and layout (look and feel) within an app by applying themes using a familiar style sheet-based approach.

The systems and methods of the present disclosure can provide a user experience for a mobile and touch interface. The systems and methods of the present disclosure enable users to ask and answer new questions while in new situations and contexts out on the road.

The systems and methods of the present disclosure can comprise server-based application development. Developers are able to do their work anywhere, on any machine—including tablets—and move among computers to get their work done. Wherever they are working they will always get the same interface and user experience. Server-based development will also facilitate collaborative application development more naturally than client-based development.

The systems and methods of the present disclosure enable global access to specific apps while they are not connected to the host server ("offline"). (Picture a pharmaceutical sales rep preparing for customer visits in a hospital, for example.) In the example "Take Your Data on the Road" scenario, people will be able to access apps on touch-enabled services regardless of whether or not they are connected to a Server. They will be able to sync server based apps and views of data with their touchscreen devices before going offline.

The systems and methods of the present disclosure can provide a "hub"—an entry point for users to begin their exploration, analysis, and collaboration. In an aspect, users do not have to navigate to a separate portal to find apps and content that may be of value to them. From the hub users will be able to find and discover what's interesting to them—not just the apps to which they have access, but info about which of the streams or feeds they subscribe to have been updated. The same hub will be the place users go to share, publish, subscribe to, comment on, and search for insights generated by others.

It's important for people involved in a community to be able locate others who have published content or exposed insights that may be of interest—all toward the end of increased transparency, higher productivity, and proactive decision making.

The systems and methods of the present disclosure can comprise data storytelling. Data storytelling helps to justify business decisions, sell their proposed decisions to others, and explain to others why a decision has been made. It will help people not only make decisions but also decide what to do next after a decision has been made. In an aspect, users can create interactive stories and share them with others. With data storytelling, users can combine interactive data visualization techniques with descriptive text to build a comprehensive story and then share this story with others. A story, in this context, is a cohesive narrative that instructs or interests the recipient of the story and shows what, why, where, and when something happened.

The systems and methods of the present disclosure can provide an open format and online marketplace. With browser-based development, developers can work from any computer: tablet, laptop, or desktop. A scriptlet approach enables extensive reuse of code. Even non-technical business users will be able to grab pieces of script from a repository and drag them into an app to easily bring new analytic capabilities to life.

The systems and methods of the present disclosure can comprise APIs that permit access to data and visualizations by a middleware server. A formalized API that uses the lightweight data interchange format JSON (JavaScript object notation) can be used for communication between the client and the engine (server).

The systems and methods of the present disclosure can deliver cross-geography clustering (ensuring higher availability) and software licensing to support globalization. Tools and documentation can be provided to make it easier for system administrators to recover servers when a machine fails and another one needs to start up. The systems and methods of the present disclosure can comprise a single, general-purpose security configuration.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the scope of the methods and systems. Efforts have been made to ensure accuracy with respect to numbers (e.g., amounts, syntax, etc.), but some errors and deviations should be accounted for.

Figure 29:
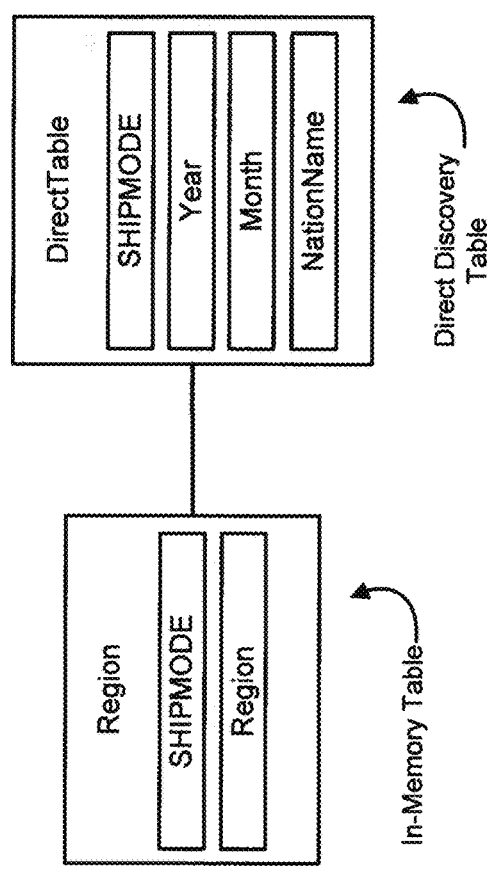
FIG. 29 is an exemplary data table association.
Figure 30:
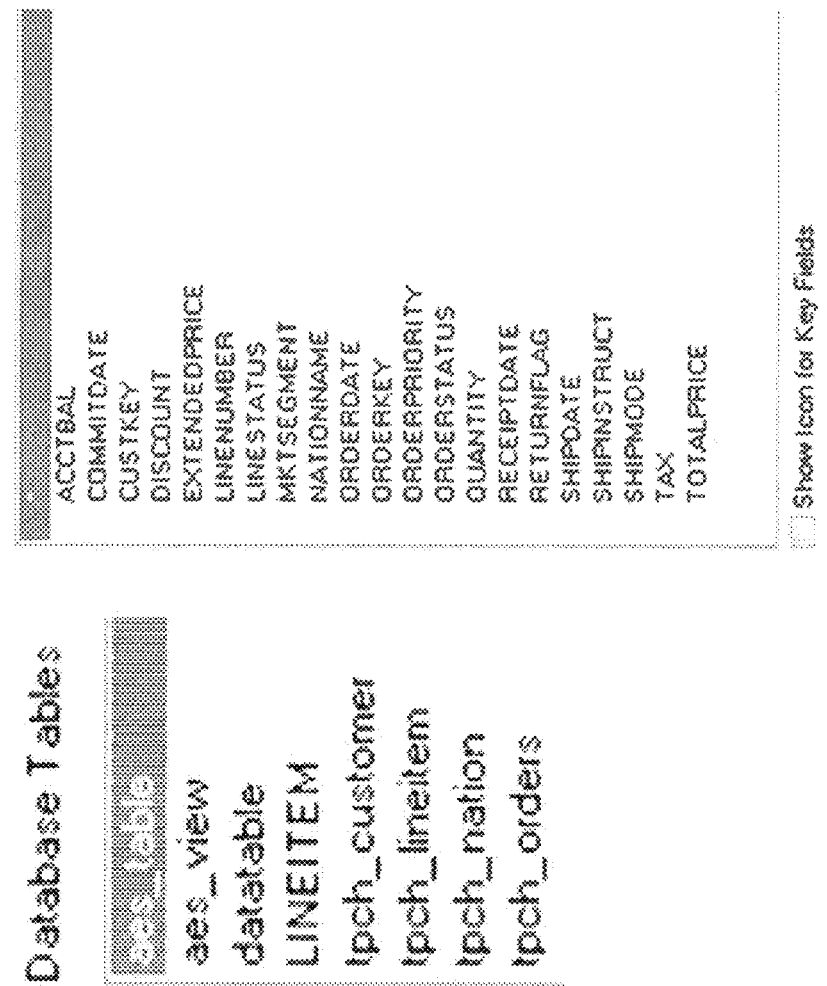
FIG. 30 is an exemplary data table.

In an aspect, a software application can comprise one or more in-memory tables in addition to a direct discovery data source, as illustrated FIG. 29. As an example, the direct discovery data table in the database can have 21 fields, as shown in FIG. 30. As a further example, four of the direct discovery data fields are loaded into the software application memory via direct discovery logic, thereby defining explicit direct discovery fields. The other 17 fields (implicit direct discovery fields) are available to the software application at the metadata level and the actual data values for these fields will only be loaded to the user interface when they are used on data objects or as part of data expressions.

In an aspect, the direct discovery capability allows the user to rename the direct discovery fields or to create new data values from the direct discovery fields. These features allow the users interact with the external data sources from the user interface with the business terminology that they are familiar with. When the metadata definition of the external data source fields are changed or new data fields are created at the software level, direct discovery automatically converts these to the metadata definitions that are used in the external data source. This process happens seamlessly during the direct discovery SQL generation from the application.

Figure 32:
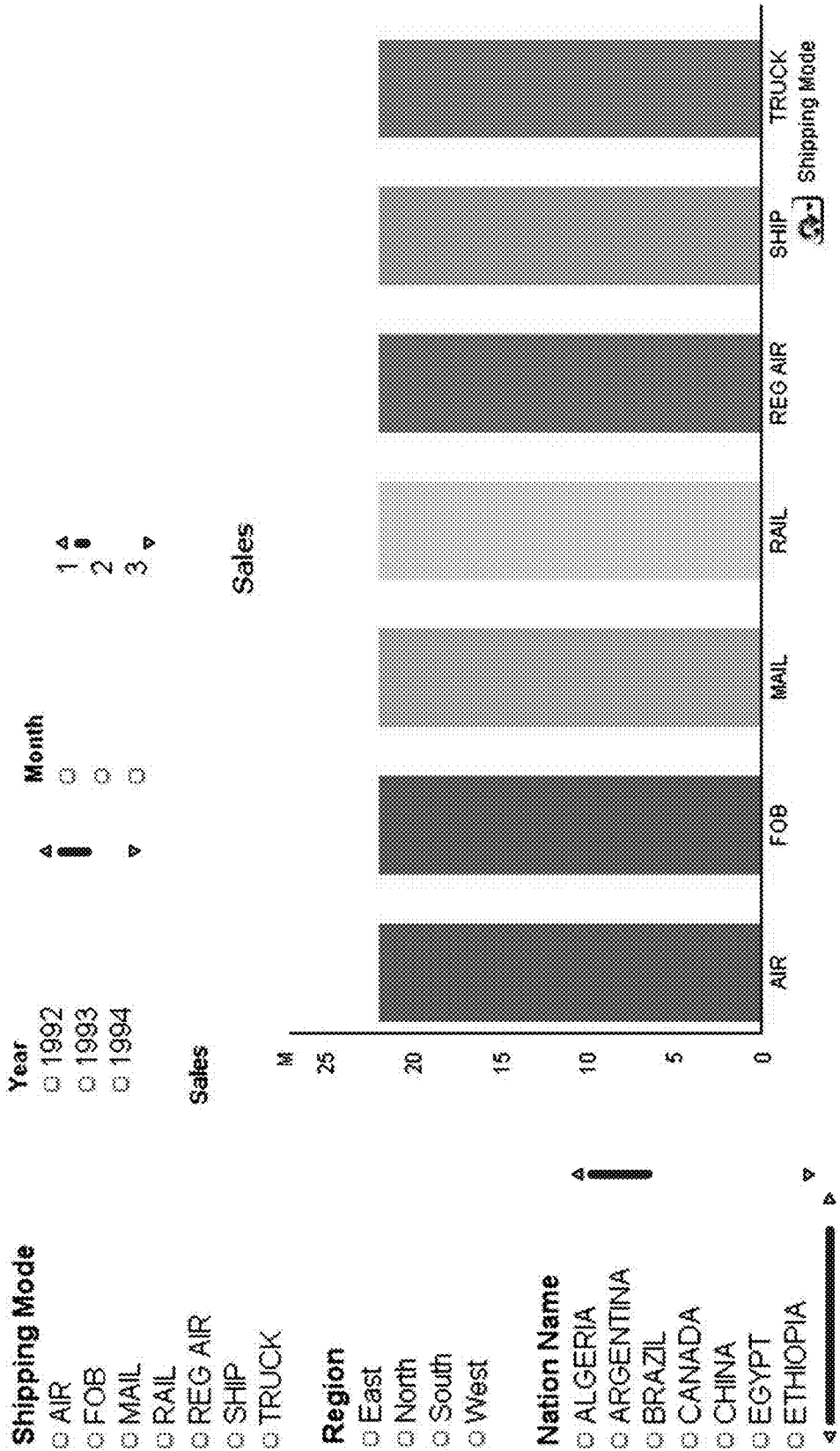
FIG. 32 is an exemplary visualization.

In this specific example, SHIPDATE direct discovery source data field is used to create two new data fields, Year and Month, to be used on the user interface, as shown in FIG. 31. As an example, FIG. 32 illustrates a user interface created for this specific use case. On the user interface, the use of in-memory (region) and direct discovery fields (Shipping mode, Year, Month, Sales, and Nation Name) is seamless to the users. Users are able to remix and use both the in-memory and direct discovery fields seamlessly without knowing anything about the underlying data structure and how the data sets are joined together.

Figure 33:
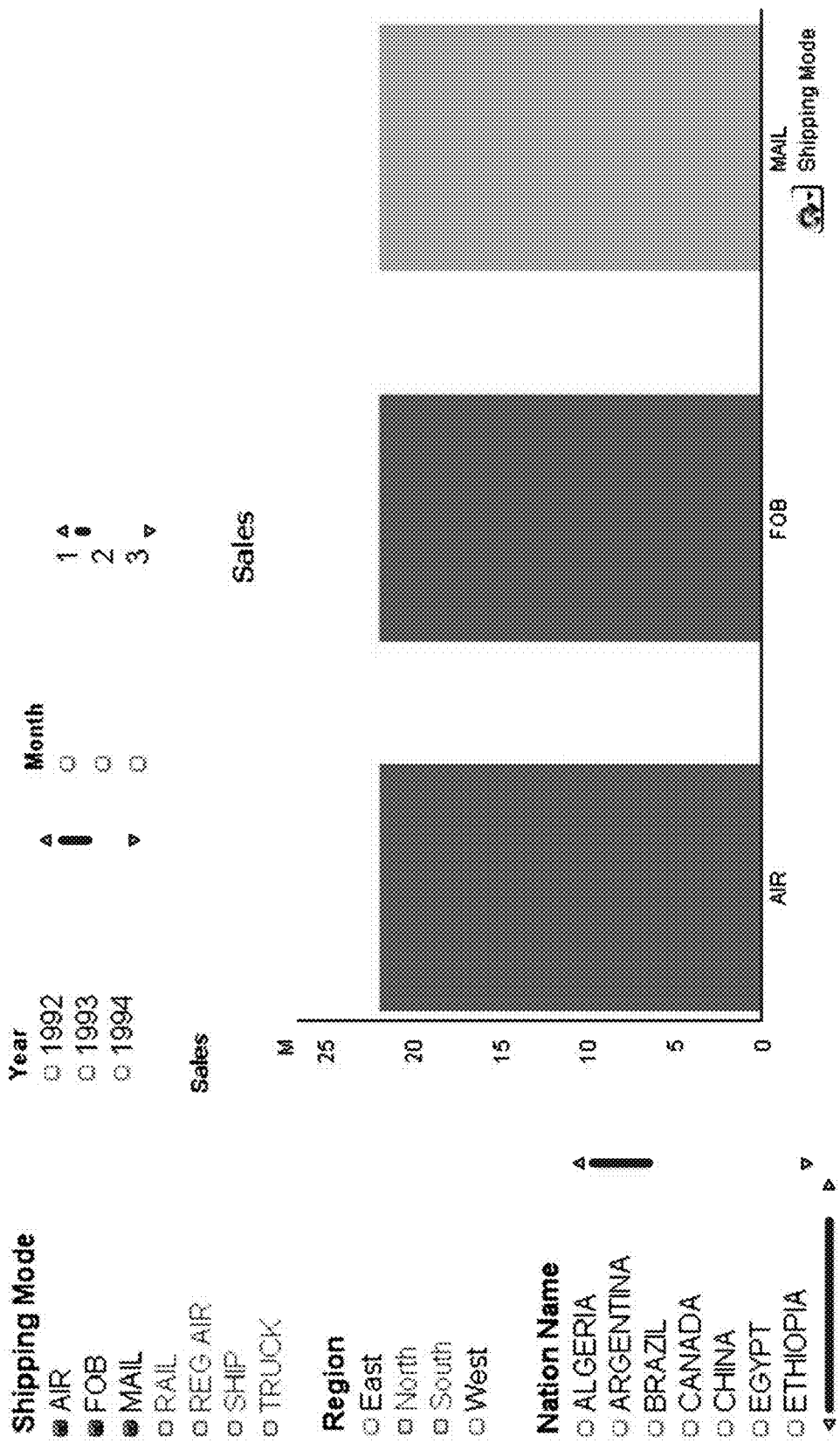
FIG. 33 is an exemplary visualization.

In an aspect, a user can make selections on explicit direct discovery fields. For example, fields AIR, FOB, MAIL can be selected on the shipping mode explicit direct discovery field, as shown in FIG. 33. The application can create direct discovery SQLs for the direct discovery fields used on the user interface by using the selection values as condition. As an example, the application can generate a direct discovery SQL to create the associations for Nation Name direct discovery field, as follows:

SELECT NATIONNAME FROM tpcd1TB.CustLineitemOrder_view WHERE
SHIPMODE IN ( 'AIR' , 'FOB' , 'SHIP' ) GROUP BY NATIONNAME The application can generate direct discovery SQL to create the associations for "year" of the Ship Date direct discovery field, as follows:

SELECT (EXTRACT ( YEAR FROM ( SHIPDATE ))(TITLE 'Year'))
FROM
tpcd1TB.CustLineitemOrder_view WHERE SHIPMODE IN ( 'AIR' , 'FOB' , 'SHIP' )
GROUP BY (EXTRACT ( YEAR FROM ( SHIPDATE ))(TITLE 'Year'))

The application can generate direct discovery SQL to create the associations for "month" of the Ship Date direct discovery field, as follows:

SELECT (EXTRACT ( MONTH FROM ( SHIPDATE ))(TITLE 'Month')) FROM
tpcd1TB.CustLineitemOrder_view WHERE SHIPMODE IN ( 'AIR' , 'FOB' , 'SHIP' ) GROUP BY (EXTRACT ( MONTH FROM ( SHIPDATE ))(TITLE 'Month'))

Figure 34:
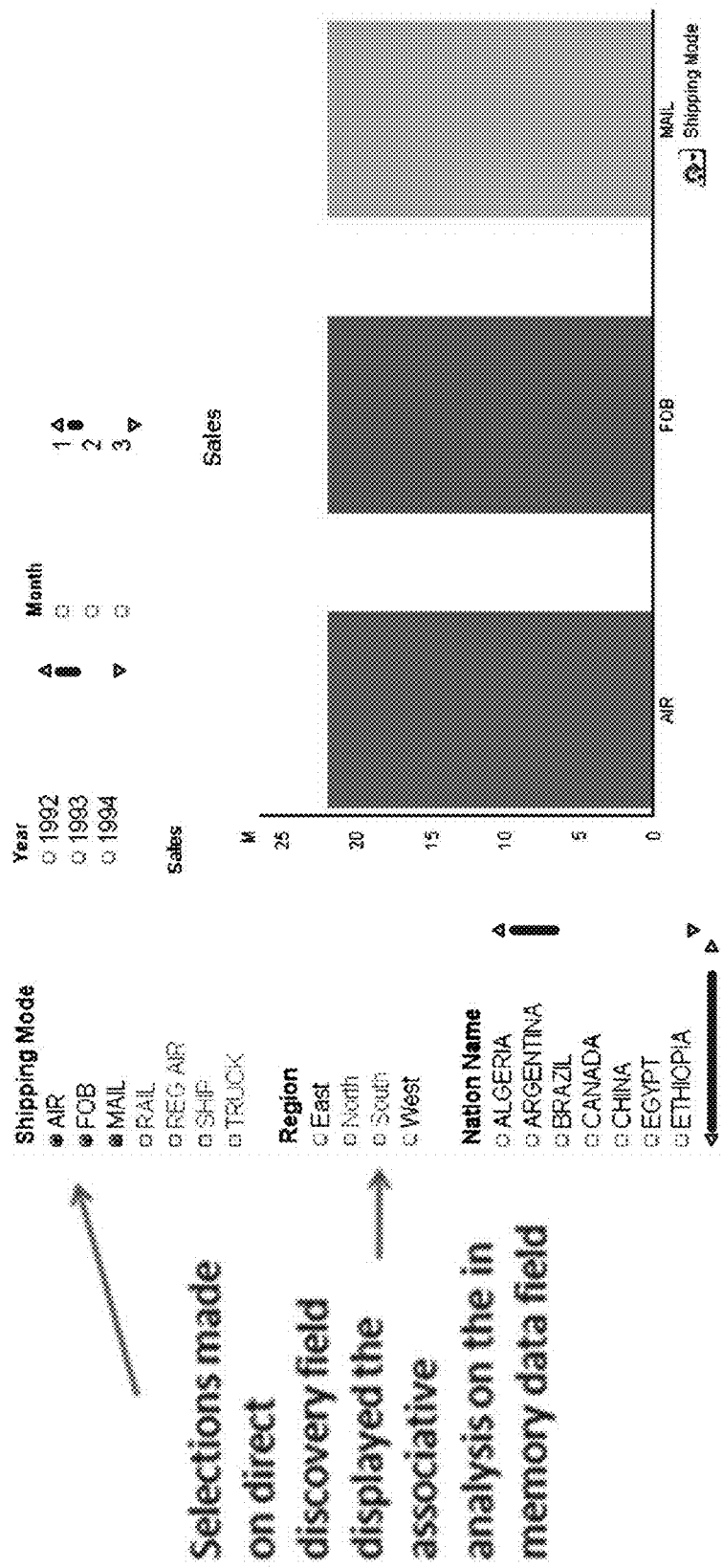
FIG. 34 is an exemplary visualization.

The application can generate direct discovery SQL to create a chart for presenting Quantity data by Ship mode, as follows:

SELECT NATIONNAME, COUNT ( * ) , SUM ( QUANTITY ) AS C0_FROM
tpcd1TB.CustLineitemOrder_view WHERE SHIPMODE IN ( 'AIR' , 'FOB' , 'SHIP' ) GROUP BY NATIONNAME In an aspect, the selections that are done on direct discovery field (shipping mode) generated associative analysis on in-memory data field (Region), as illustrated in FIG. 34. Only East and West regions are highlighted in white as these are the in memory data values that are associated with the selected direct discovery data values. The chart illustrated in FIG. 34 also displays the Quantity information (implicit direct discovery field) by shipping mode for the select direct discovery data values. All of the other fields used in the application shows the same associative data analysis capability. For example as all of the Year values are associated with the selections, they are displayed in white.

Figure 35:
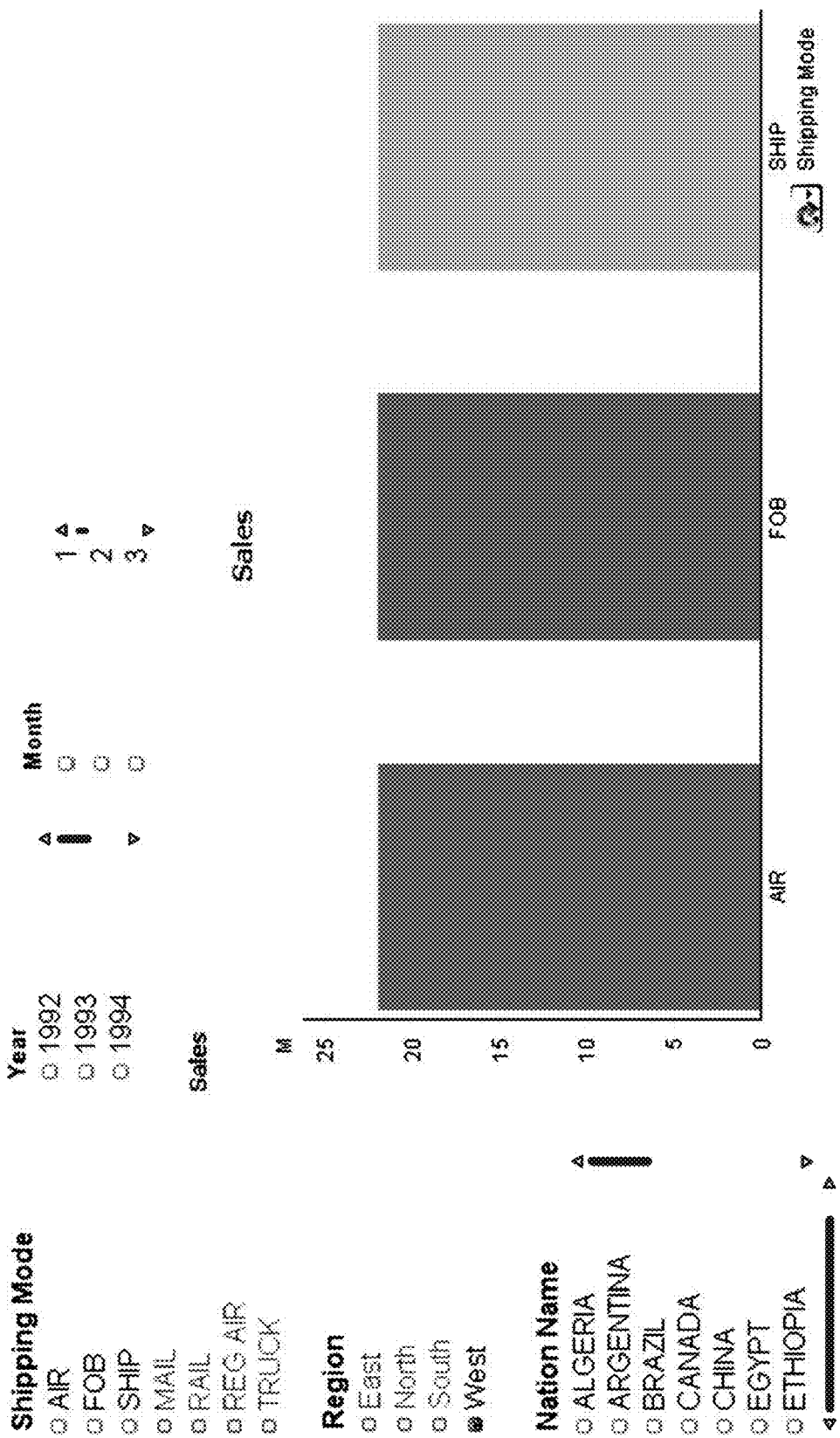
FIG. 35 is an exemplary visualization.

In an aspect, the user makes selections on in memory data field. As an example, West region can be selected on the Region in-memory field, as illustrated in FIG. 35. An application can creates direct discovery SQLs for the direct discovery fields used on the user interface by using the associated direct discovery data values as condition. As an example, the application can generate direct discovery SQL to create the associations for Nation Name direct discovery field, as follows:

SELECT NATIONNAME FROM tpcd1TB.CustLineitemOrder_view
WHERE
SHIPMODE IN ( 'AIR' , 'FOB' , 'SHIP' ) GROUP BY NATIONNAME The application can generate direct discovery SQL to create the associations for "year" of the Ship Date direct discovery field, as follows:

SELECT (EXTRACT ( YEAR FROM ( SHIPDATE ))(TITLE 'Year'))
FROM
tpcd1TB.CustLineitemOrder_view WHERE SHIPMODE IN ( 'AIR' , 'FOB' , 'SHIP' )
GROUP BY (EXTRACT ( YEAR FROM ( SHIPDATE ))(TITLE 'Year'))

The application can generate direct discovery SQL to create the associations for "month" of the Ship Date direct discovery field, as follows:

SELECT (EXTRACT ( MONTH FROM ( SHIPDATE ))(TITLE 'Month')) FROM
tpcd1TB.CustLineitemOrder_view WHERE SHIPMODE IN ( 'AIR' , 'FOB' , 'SHIP' )
GROUP BY (EXTRACT ( MONTH FROM ( SHIPDATE ))(TITLE 'Month'))

Figure 36:
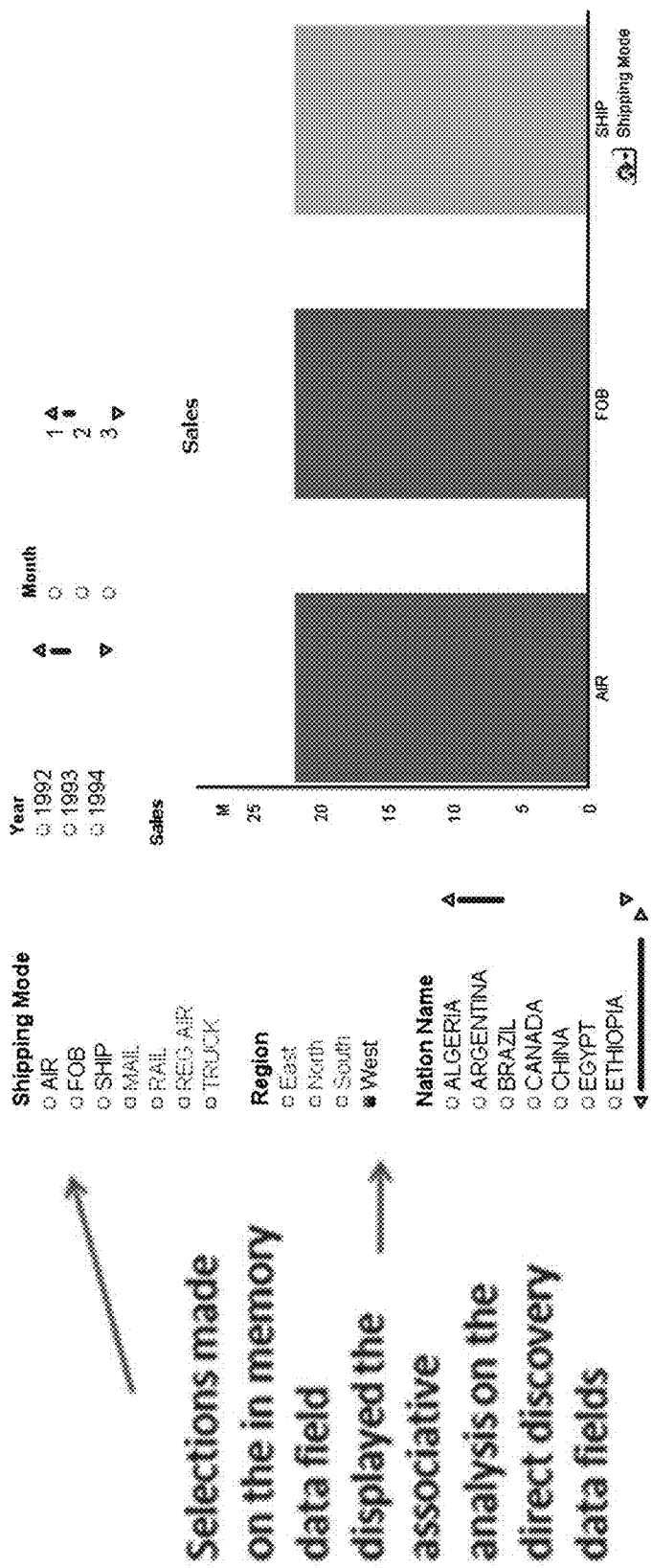
FIG. 36 is an exemplary visualization.

The application can generate direct discovery SQL to create a chart for presenting Quantity data by Ship mode, as follows:

SELECT NATIONNAME, COUNT ( * ) , SUM ( QUANTITY ) AS
C0_FROM
tpcd1TB.CustLineitemOrder_view WHERE SHIPMODE IN ( 'AIR' , 'FOB' , 'SHIP' )
GROUP BY NATIONNAME As an example, the selections that are done on in memory field (region) generated associative analysis on direct discovery data fields (Nation Name, Shipping mode, Quantity, Ship Date), as illustrated in FIG. 36. As a further example, only AIR, FOB, SHIP are highlighted in white as these are the direct discovery shipping mode data values that are associated with the selected direct in memory data value, West region. The chart can also display the Quantity information (implicit direct discovery field) by shipping mode for the select in memory data value. All of the other fields used in the application show the same associative data analysis capability. For example as all of the Year values are associated with the selections, they are displayed in white.

It is possible to use unique in-memory capabilities with the direct discovery data when the query results are returned into user interface. For example, direct discovery data can be aggregated by an in memory data field and the aggregated data values can be used as selection (filtering) values, as follows:

=aggr(sum(QUANTITY), Region)

Figure 37:
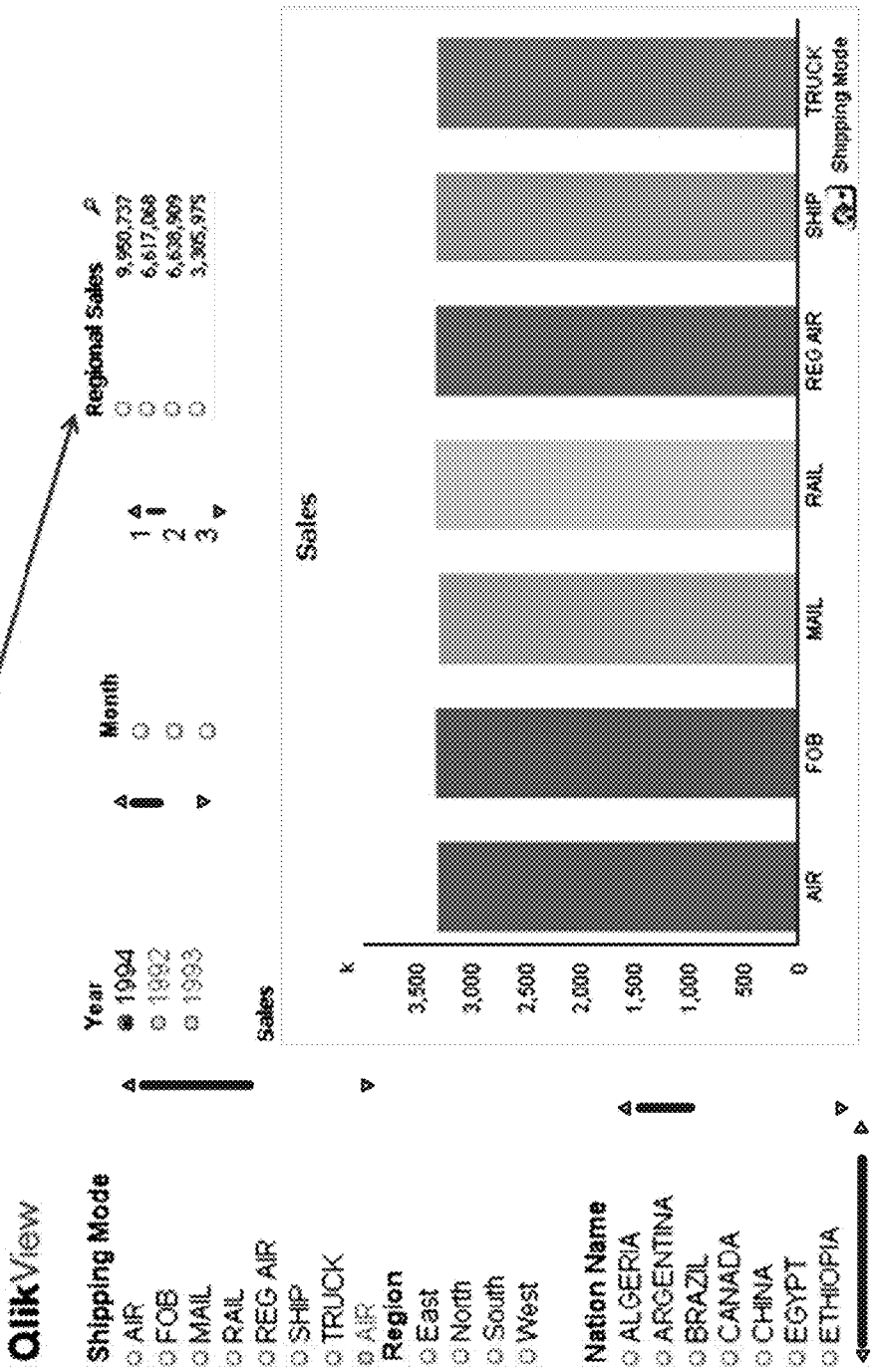
FIG. 37 is an exemplary visualization.

This example aggregates the implicit direct discovery data at the region in memory data values level. The result is the aggregates quantity numbers for each region that could be used for data selection (filtering), as illustrated in FIG. 37.

New and additional data associations can be defined between the direct discovery data and in memory data sets once the direct discovery data results are available on the user interface.

This example is only one of the use cases where additional data associations can be defined between the direct discovery data and in memory data sets. In this example, the implicit direct discovery quantity data is only associated with in memory data west region, as follows:

sum({<Region={"West"}>}aggr(sum(QUANTITY), SHIPMODE))

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications are referenced. The disclosures of these publications in their entireties are hereby incorporated by reference into this application in order to more fully describe the state of the art to which the methods and systems pertain.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method for data management comprising:
    defining a plurality of data tables, wherein one or more of the plurality of data tables comprises a data field;
    loading a first data table of the plurality of data tables in a first memory of a first computing device, wherein one or more data fields of the first data table is associated with a second data table of the plurality of data tables, and wherein the second data table is resident in a second memory of a second computing device external to the first computing device;
    linking a portion of the first data table with a portion of the second data table, wherein the linking indicates that one or more data fields of the second data table are one or more implicit data fields not intended to be loaded into the first memory; and
    presenting, via the first computing device, a visualization comprising both the portion of the first data table and the portion of the second data table, wherein the visualization instructs the first computing device to access the portion of the first data table from the first memory and the portion of the second data table from the second memory for presentation in the visualization.

2. The method of claim 1, wherein the second data table is not loaded in the first memory.

3. The method of claim 1, further comprising loading at least a portion of the second data table in the first memory to generate an explicit data field, wherein the explicit data field facilitates presenting the visualization.

4. The method of claim 1, wherein presenting, via the first computing device, the visualization comprises executing an expression using the one or more implicit data fields of the second data table.

5. The method of claim 4, wherein the expression comprises a sum, an average, a count, a minimum value, a maximum value, or a combination thereof.

6. The method of claim 4, wherein the expression represents an aggregate of the one or more implicit data fields of the second data table and one or more data fields of the first data table.

7. A method for data management comprising:
    loading a first portion of stored data in a first memory of a first computing device, wherein a second portion of the stored data is resident in a second memory of a second computing device external to the first computing device;
    linking the first portion of stored data with the second portion of stored data, wherein the linking indicates that one or more data fields of the second portion of stored data are one or more implicit data fields not intended to be loaded into the first memory;
    analyzing the first portion of stored data and the second portion of stored data, wherein analysis of the first portion of stored data is implemented locally to the first memory and analysis of the second portion of stored data is implemented locally to the second memory; and
    presenting, by the first computing device, a visualization of the first portion of stored data and the second portion of stored data based on analyzing the first portion of stored data and the second portion of stored data, wherein the visualization instructs the computing device to access the analysis of the first portion of the stored data from the first memory and the analysis of the second portion of the stored data from the second memory for the visualization.

8. The method of claim 7, wherein the second memory is disposed remotely from the first memory.

9. The method of claim 7, wherein the second portion of stored data is not loaded in the first memory.

10. The method of claim 7, further comprising loading at least a portion of the second portion of stored data in the first memory to generate an explicit data field, wherein the explicit data field facilitates presenting the visualization.

11. The method of claim 7, wherein analyzing the second portion of stored data comprises executing an expression using the one or more implicit data fields of the second portion of stored data.

12. The method of claim 11, wherein the expression comprises a sum, an average, a count, a minimum value, a maximum value, or a combination thereof.

13. The method of claim 11, wherein the expression represents an aggregate first portion of stored data and the second portion of stored data.

14. A method for data management comprising:
- defining a plurality of data tables, wherein one or more of the plurality of data tables comprises a data field;
- loading a first data table of the plurality of data tables in a first memory of a computing device, wherein one or more data fields of the first data table is associated with a second data table of the plurality of data tables, and wherein one or more data fields of the second data table is resident in a second memory;
- determining, based on a linking between a portion of the one or more data fields of the first data table with a portion of the one or more data fields of the second data table, that the portion of the one or more data fields of the second data table are one or more implicit data fields not intended to be loaded into the first memory;
- presenting, by the computing device, a visualization of the first data table; and
- presenting, by the computing device, a symbol table representing a portion of the second data table, wherein the symbol table is configured to facilitate interaction between a user and the one or more implicit data fields of the second data table not loaded into the first memory.

15. The method of claim 14, wherein the second data table comprises implicit data fields.

16. The method of claim 14, wherein the second memory is disposed remotely from the first memory.

17. The method of claim 14, further comprising linking at least a portion of the first data table with at least a portion of the second data table.

18. The method of claim 14, wherein presenting the visualization comprises executing an expression using one or more implicit data fields of the second data table.

19. The method of claim 18, wherein the expression comprises a sum, an average, a count, a minimum value, a maximum value, or a combination thereof.

* * * * *